(12) United States Patent
Palmer et al.

(10) Patent No.: US 11,535,209 B2
(45) Date of Patent: Dec. 27, 2022

(54) WHEEL CHOCK WITH LOCKING MECHANISM

(71) Applicant: 9172-9863 QUEBEC INC., Terrebonne (CA)

(72) Inventors: Gregory Palmer, Mascouche (CA); Jonathan Dube, Sainte-Julienne (CA); Daniel Grothe, Terrebonne (CA); Gaetan Jette, Mascouche (CA); Marc-Andre Boivin, Mascouche (CA)

(73) Assignee: 9172-9863 QUÉBEC INC., Terrebonne (CA)

( * ) Notice: Subject to any disclaimer, the term of this patent is extended or adjusted under 35 U.S.C. 154(b) by 288 days.

(21) Appl. No.: 16/818,609

(22) Filed: Mar. 13, 2020

(65) Prior Publication Data
US 2020/0216276 A1    Jul. 9, 2020

Related U.S. Application Data

(63) Continuation of application No. PCT/CA2018/051137, filed on Sep. 13, 2018.

(60) Provisional application No. 62/558,717, filed on Sep. 14, 2017.

(51) Int. Cl.
| | |
|---|---|
| *B60T 3/00* | (2006.01) |
| *B65G 69/00* | (2006.01) |
| *B60P 3/077* | (2006.01) |

(52) U.S. Cl.
CPC .............. *B60T 3/00* (2013.01); *B65G 69/005* (2013.01); *B60P 3/077* (2013.01)

(58) Field of Classification Search
CPC ................................ B65G 69/005; B60T 3/00
See application file for complete search history.

(56) References Cited

U.S. PATENT DOCUMENTS

| | | | |
|---|---|---|---|
| 2,316,178 | A | 4/1943 | Morgensen, Jr. |
| 2,413,744 | A | 1/1947 | Carter |
| 2,465,551 | A | 3/1949 | Otterness |
| 2,697,494 | A | 12/1954 | Parks |
| 2,771,162 | A | 11/1956 | Marsh |

(Continued)

FOREIGN PATENT DOCUMENTS

| | | |
|---|---|---|
| CA | 2164737 A1 | 6/1997 |
| CA | 2164738 A1 | 3/2009 |

(Continued)

OTHER PUBLICATIONS

Machine translation in English of CN203111202.
(Continued)

*Primary Examiner* — Kaitlin S Joerger
(74) *Attorney, Agent, or Firm* — Fasken Martineau DuMoulin LLP

(57) ABSTRACT

The wheel chock includes a locking mechanism that can be held in a locked state when properly positioned on a base plate. The locking mechanism includes a positioning unit having at least one tooth provided to engage a side of a corresponding one of the blocking elements in a latched engagement when the positioning unit is in the fully locked position. The locking mechanism also includes first means for moving the positioning unit from the unlocked position towards the fully locked position, and second means for selectively holding the positioning unit in the fully locked position.

18 Claims, 38 Drawing Sheets

(56) References Cited

U.S. PATENT DOCUMENTS

| | | |
|---|---|---|
| 2,835,349 A | 5/1958 | Veselik et al. |
| 2,858,905 A | 11/1958 | Fahland |
| 2,954,101 A | 9/1960 | Corson |
| 3,065,827 A | 11/1962 | Timbers |
| 3,074,569 A | 1/1963 | Ajero |
| 3,077,247 A | 2/1963 | West et al. |
| 3,119,466 A | 1/1964 | Gilson |
| 3,120,292 A | 2/1964 | Rambat |
| 3,157,194 A | 11/1964 | Stolte |
| 3,189,127 A | 6/1965 | Karnow et al. |
| 3,258,088 A | 6/1966 | Bowen |
| 3,305,049 A | 2/1967 | Willey |
| 3,321,046 A | 5/1967 | Cooper |
| 3,425,517 A | 2/1969 | Speir |
| 3,542,157 A | 11/1970 | Noah |
| 3,581,846 A | 6/1971 | Janus |
| 3,664,466 A | 5/1972 | Rotheiser |
| 3,666,119 A | 5/1972 | Parsons |
| 3,695,394 A | 10/1972 | Carpenter |
| 3,700,077 A | 10/1972 | Harder |
| 3,734,241 A | 5/1973 | Hale |
| 3,845,844 A | 11/1974 | Woerner |
| 3,845,845 A | 11/1974 | Geisthoff |
| 3,907,072 A | 9/1975 | Shafer |
| 4,155,429 A | 5/1979 | Schessl |
| 4,155,523 A | 5/1979 | Morford et al. |
| 4,191,503 A | 3/1980 | Neff et al. |
| 4,207,019 A | 6/1980 | Cone |
| 4,217,831 A | 8/1980 | Koliba et al. |
| 4,399,893 A | 8/1983 | Switzer |
| 4,441,586 A | 4/1984 | Bernier |
| 4,555,211 A | 11/1985 | Metz |
| 4,582,176 A | 4/1986 | Roberts |
| 4,641,994 A | 2/1987 | Hankison |
| 4,674,929 A | 6/1987 | Blunden |
| 4,676,344 A | 6/1987 | Locicero |
| 4,682,922 A | 7/1987 | Andre et al. |
| 4,739,863 A | 4/1988 | Stauffer |
| 4,781,271 A | 11/1988 | Wokeck |
| 4,784,567 A | 11/1988 | Hageman et al. |
| 4,804,070 A | 2/1989 | Bohler |
| 4,804,302 A * | 2/1989 | Andre .................... B60P 3/075 410/143 |
| 4,833,442 A | 5/1989 | Von Heck |
| 4,854,790 A | 8/1989 | Andre |
| 4,934,489 A | 6/1990 | Jackson |
| 4,955,459 A | 9/1990 | Murphy |
| 4,963,068 A | 10/1990 | Gelder |
| 4,969,792 A | 11/1990 | Ellis et al. |
| 4,973,213 A | 11/1990 | Erlandsson |
| 5,025,877 A | 6/1991 | Assh |
| 5,096,021 A | 3/1992 | Tart |
| D326,254 S | 5/1992 | Ziaylek, Jr. et al. |
| 5,173,018 A | 12/1992 | Kissel et al. |
| 5,249,905 A | 10/1993 | Warner et al. |
| 5,286,138 A | 2/1994 | Goodwin |
| 5,302,063 A | 4/1994 | Winsor |
| 5,312,213 A | 5/1994 | Winsor |
| 5,348,437 A | 9/1994 | Krupke et al. |
| 5,368,134 A | 11/1994 | Rickman et al. |
| 5,375,965 A | 12/1994 | Springer et al. |
| 5,381,680 A | 1/1995 | Rauch, Jr. |
| 5,392,880 A | 2/1995 | Christian |
| 5,410,897 A | 5/1995 | Edmondson |
| 5,427,209 A | 6/1995 | Tannehill et al. |
| 5,435,418 A | 7/1995 | Warren et al. |
| 5,520,034 A | 5/1996 | Edmondson |
| 5,531,557 A | 7/1996 | Springer |
| 5,547,045 A | 8/1996 | Stutzman |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles, Jr. et al. |
| 5,709,518 A | 1/1998 | Alexander et al. |
| 5,743,697 A | 4/1998 | Alexander |
| 5,762,459 A | 6/1998 | Springer et al. |
| 5,803,208 A | 9/1998 | Blach |
| 5,878,940 A | 3/1999 | Rosenbalm |
| 5,901,816 A | 5/1999 | Camilleri |
| 5,902,082 A | 5/1999 | Kaemper |
| 5,934,857 A | 8/1999 | Alexander |
| D422,960 S | 4/2000 | Henry |
| 6,082,952 A | 7/2000 | Alexander |
| 6,092,970 A | 7/2000 | Hahn et al. |
| 6,123,496 A | 9/2000 | Alexander |
| 6,238,163 B1 | 5/2001 | Springer et al. |
| 6,250,432 B1 | 6/2001 | Hageman et al. |
| 6,290,029 B1 | 9/2001 | Gubler et al. |
| 6,336,527 B1 | 1/2002 | Metz |
| 6,357,987 B1 | 3/2002 | Palus |
| 6,368,043 B1 | 4/2002 | Leum et al. |
| 6,371,253 B1 | 4/2002 | Berends et al. |
| 6,378,956 B1 | 4/2002 | Van De Walker |
| 6,425,465 B1 | 7/2002 | Tallman et al. |
| 6,439,823 B1 | 8/2002 | Lambert |
| 6,505,713 B1 | 1/2003 | Paul et al. |
| 6,524,053 B2 | 2/2003 | Hahn et al. |
| 6,585,211 B1 | 7/2003 | Hageman et al. |
| 6,589,003 B2 | 7/2003 | Berends |
| 6,676,360 B2 | 1/2004 | Springer et al. |
| 6,725,979 B1 | 4/2004 | Snook |
| 6,752,381 B2 | 6/2004 | Colak et al. |
| 6,773,221 B2 | 8/2004 | Belongia et al. |
| 6,835,034 B2 | 12/2004 | Winsor |
| 6,851,523 B1 | 2/2005 | Gaster |
| 6,863,481 B2 | 3/2005 | Pingel |
| 6,926,480 B2 | 8/2005 | Anderson et al. |
| 6,938,734 B2 | 9/2005 | Curl |
| 6,948,593 B2 | 9/2005 | Horton |
| 6,978,865 B2 | 12/2005 | Fougere |
| 7,000,740 B2 | 2/2006 | Chrisco et al. |
| 7,032,720 B2 | 4/2006 | Jette et al. |
| 7,036,637 B1 | 5/2006 | Wiens |
| 7,044,698 B2 | 5/2006 | Winsor |
| 7,128,508 B2 | 10/2006 | Anderson et al. |
| 7,168,527 B2 | 1/2007 | Bateman |
| 7,226,265 B2 | 6/2007 | Wilson |
| 7,264,092 B2 | 9/2007 | Jette |
| 7,284,641 B1 | 10/2007 | Spence, III |
| 7,299,902 B2 | 11/2007 | Thorpe |
| 7,316,043 B2 | 1/2008 | Henblad et al. |
| 7,537,095 B2 | 5/2009 | Eriksson |
| 7,586,401 B2 | 9/2009 | Payne |
| 7,632,052 B2 | 12/2009 | Tatina |
| D633,850 S | 3/2011 | Morin |
| 7,914,042 B2 | 3/2011 | Andersen et al. |
| 7,958,973 B2 | 6/2011 | Swasand |
| D644,159 S | 8/2011 | Marcum |
| 7,999,680 B2 | 8/2011 | Penot |
| 8,006,811 B2 | 8/2011 | Andersen et al. |
| 8,047,751 B2 | 11/2011 | Powers et al. |
| 8,104,588 B2 | 1/2012 | Curlee et al. |
| 8,286,757 B2 | 10/2012 | Nelson |
| 8,286,997 B2 | 10/2012 | Kimener et al. |
| 8,307,956 B2 | 11/2012 | Andersen et al. |
| 8,365,875 B2 | 2/2013 | Garceau |
| 8,443,945 B2 | 5/2013 | Perkins |
| 8,464,846 B2 | 6/2013 | Andersen et al. |
| 8,465,245 B2 | 6/2013 | Manone et al. |
| 8,499,897 B2 | 8/2013 | Brooks et al. |
| 8,499,899 B2 | 8/2013 | Scott |
| 8,528,929 B2 | 9/2013 | Kimener |
| 8,562,264 B2 | 10/2013 | Winsor |
| 8,590,673 B2 | 11/2013 | Andersen et al. |
| 8,590,674 B2 * | 11/2013 | Jette .................... B60T 3/00 188/4 R |
| 8,657,078 B2 | 2/2014 | Wolfram |
| 8,662,803 B2 | 3/2014 | Bowman et al. |
| 8,690,501 B2 | 4/2014 | Bullock |
| 8,779,948 B2 | 7/2014 | Faus et al. |
| 8,783,608 B2 | 7/2014 | Affre De Saint Rome |
| 8,807,291 B2 | 8/2014 | Saubade |
| 8,826,963 B2 | 9/2014 | Wiegel et al. |
| 8,831,970 B2 | 9/2014 | Weik, III et al. |

(56) References Cited

U.S. PATENT DOCUMENTS

| | | | |
|---|---|---|---|
| 8,857,574 B2 | 10/2014 | De Jong | |
| 8,869,948 B2 | 10/2014 | Saliger et al. | |
| 8,887,874 B2 | 11/2014 | Bellota | |
| D720,278 S | 12/2014 | Pinkall | |
| 8,905,198 B2 | 12/2014 | Brooks et al. | |
| 9,010,501 B2 | 4/2015 | Brooks et al. | |
| 9,073,472 B2 | 7/2015 | Hellenschmidt et al. | |
| 9,079,523 B2 | 7/2015 | Morin | |
| 9,126,775 B2 * | 9/2015 | Brooks | B65G 69/005 |
| 9,139,384 B2 | 9/2015 | Brooks, IV et al. | |
| 9,162,831 B2 | 10/2015 | De Jong | |
| 9,212,797 B2 | 12/2015 | Jeong | |
| 9,290,336 B2 | 3/2016 | Ballester | |
| 9,909,851 B2 | 3/2018 | Lanigan, Sr. et al. | |
| D830,280 S | 10/2018 | Erickson | |
| 10,179,572 B2 | 1/2019 | Metz et al. | |
| D855,005 S | 7/2019 | Delancey et al. | |
| 10,393,627 B2 | 8/2019 | Etches et al. | |
| 10,501,058 B2 | 12/2019 | Rancourt et al. | |
| D873,196 S | 1/2020 | Harrington | |
| 10,625,961 B2 | 4/2020 | De Jong | |
| D892,706 S | 8/2020 | Sveum et al. | |
| 11,007,920 B2 | 5/2021 | Vande Sande et al. | |
| 11,046,298 B1 | 6/2021 | Desmarais et al. | |
| 2001/0026751 A1 | 10/2001 | Berends | |
| 2004/0108172 A1 | 6/2004 | Fox | |
| 2005/0047887 A1 | 3/2005 | Kenny | |
| 2005/0133315 A1 | 6/2005 | Hoofard | |
| 2007/0050999 A1 | 3/2007 | Milner et al. | |
| 2008/0124203 A1 | 5/2008 | McDonald | |
| 2008/0314693 A1 | 12/2008 | Van Aspert | |
| 2009/0035088 A1 * | 2/2009 | Powers | B60T 3/00 410/30 |
| 2009/0169298 A1 | 7/2009 | Lane | |
| 2012/0080576 A1 * | 4/2012 | Winsor | B60P 3/077 248/346.03 |
| 2015/0027818 A1 * | 1/2015 | Bellota | B60T 1/04 188/32 |
| 2016/0272168 A1 | 9/2016 | Palmer et al. | |
| 2018/0086320 A1 | 3/2018 | Jette et al. | |
| 2019/0329994 A1 * | 10/2019 | Ion | H01F 7/06 |
| 2020/0354176 A1 | 11/2020 | Valentin | |
| 2021/0031736 A1 | 2/2021 | Perozzo | |
| 2021/0170997 A1 | 6/2021 | Widgery | |
| 2021/0316974 A1 | 10/2021 | Leum et al. | |

FOREIGN PATENT DOCUMENTS

| | | |
|---|---|---|
| CN | 203111202 U | 8/2013 |
| DE | 609179 A | 2/1935 |
| DE | 633272 A | 7/1936 |
| DE | 19706326 C1 | 10/1998 |
| EP | 0025399 B1 | 3/1983 |
| EP | 0128992 A1 | 12/1984 |
| EP | 0284532 A1 | 9/1988 |
| EP | 0384850 B1 | 11/1994 |
| EP | 0537075 B1 | 4/1995 |
| EP | 0496727 B1 | 9/1996 |
| EP | 0639488 B1 | 3/1997 |
| EP | 0836579 B1 | 2/1999 |
| EP | 0744327 B1 | 11/1999 |
| EP | 1095880 A1 | 5/2001 |
| EP | 1167253 B1 | 4/2004 |
| EP | 1764275 B1 | 4/2009 |
| EP | 2236445 B1 | 4/2011 |
| EP | 2292481 B1 | 5/2013 |
| EP | 2089302 B1 | 11/2013 |
| EP | 2380833 B1 | 9/2014 |
| EP | 2796395 A1 | 10/2014 |
| EP | 2307237 B1 | 1/2016 |
| EP | 2832669 B1 | 4/2016 |
| EP | 2851320 B1 | 11/2016 |
| EP | 2930130 B1 | 9/2017 |
| EP | 3159229 B1 | 6/2018 |
| EP | 3401251 A1 | 11/2018 |
| EP | 3210892 B1 | 1/2019 |
| EP | 3028966 B1 | 3/2019 |
| EP | 3613685 B1 | 7/2021 |
| FR | 2652340 B1 | 1/1992 |
| FR | 2689845 B1 | 8/1996 |
| FR | 2750123 B1 | 8/1998 |
| FR | 2832113 B1 | 3/2004 |
| FR | 2873351 A1 | 1/2006 |
| FR | 2869578 B1 | 6/2006 |
| FR | 2982225 B1 | 12/2013 |
| FR | 3035387 B1 | 5/2017 |
| FR | 3039528 B1 | 9/2017 |
| FR | 3055008 B1 | 8/2018 |
| FR | 3095811 A1 | 11/2020 |
| GB | 774550 A | 5/1957 |
| GB | 779681 A | 7/1957 |
| GB | 2290590 B | 4/1998 |
| GB | 2410482 B | 1/2007 |
| GB | 2528380 B | 5/2021 |
| WO | 9749625 A1 | 12/1997 |
| WO | 2020093178 A1 | 5/2000 |
| WO | 2008098742 A1 | 8/2008 |
| WO | 2010029181 A1 | 3/2010 |
| WO | 2019051599 A1 | 3/2019 |
| WO | 2020221887 A1 | 11/2020 |
| WO | 2021073952 A1 | 4/2021 |
| WO | 2022016265 A1 | 1/2022 |

OTHER PUBLICATIONS

Machine translation in English of DE19706326.
Machine translation in English of EP0284532.
Machine translation in English of EP0639488.
Machine translation in English of EP1764275.
Machine translation in English of EP2851320.
Machine translation in English of EP2930130.
Machine translation in English of EP3159229.
Machine translation in English of EP3401251.
Machine translation in English of FR2689845.
Machine translation in English of FR2750123.
Machine translation in English of FR3035387.
Machine translation in English of FR3039528.
Machine translation in English of FR3055008.
Machine translation in English of FR3095811.
Machine translation in English of WO2020221887.
Machine translation in English of CA2164737.
Machine translation in English of CA2164738.
Machine translation in English of DE609179.
Machine translation in English of DE633272.
Machine translation in English of EP0025399.
Machine translation in English of EP0128992.
Machine translation in English of EP0384850.
Machine translation in English of EP0496727.
Machine translation in English of EP0537075.
Machine translation in English of EP0836579.
Machine translation in English of EP2089302.
Machine translation in English of EP2236445.
Machine translation in English of EP2292481.
Machine translation in English of EP2307237.
Machine translation in English of EP2380833.
Machine translation in English of EP2832669.
Machine translation in English of FR2652340.
Machine translation in English of FR2869578.
Machine translation in English of FR2873351.
Machine translation in English of FR2982225.
Machine translation in English of WO9749625.
Machine translation in English of WO200898742.
Machine translation in English of WO201029181.

* cited by examiner

WHEEL CHOCK WITH LOCKING MECHANISM

CROSS REFERENCE TO PRIOR APPLICATIONS

The present case is a continuation of PCT Application No. PCT/CA2018/051137 filed on 13 Sep. 2018. PCT/CA2018/051137 claims the benefits of U.S. patent application No. 62/558,717 filed 14 Sep. 2017. The entire contents of these prior patent applications are hereby incorporated by reference.

TECHNICAL FIELD

The technical field relates generally to wheel chocks that are part of restraint systems for preventing vehicles from moving away in an unauthorized or accidental manner when they are parked, for instance at a loading area, at a loading dock, in a parking lot, or in any other suitable kinds of driveways or locations.

BACKGROUND

Wheels chocks are devices that can be positioned immediately in front of a wheel of a parked vehicle to act as an obstacle in the event of an unauthorized or accidental departure. This event can happen as a result, for instance, of an error or because someone is trying to steal the vehicle. Many other situations exist, including ones where the vehicle movements are caused by other factors, such as trailer creep where motion of a lift truck entering and exiting a trailer can cause separation between the trailer and the dock leveler.

Various wheel chock arrangements have been suggested over the years. Examples can be found, for instance, in U.S. patent application publication No. 2016/0272168 A1 published 22 Sep. 2016 and in PCT patent application No. WO 2016/191882 A1 published 8 Dec. 2016. The entire contents of these two patent applications are hereby incorporated by reference. The underside of these wheel chocks includes a plurality of teeth engaging corresponding teeth or other kinds of blocking elements provided on a ground-anchored base plate on which the wheel chocks are set to create an obstacle for vehicles in a departure direction. Other kinds of wheel chocks exist as well.

A wheel chock is greatly resistant to a force applied in the departure direction, but it can generally be moved relatively easily in the opposite direction over a distance that will be enough to pull the wheel chock off the base plate by hand. Some implementations may require a higher level of security to mitigate the risks of having an unauthorized or accidental removal of a wheel chock from the base plate.

U.S. Pat. No. 8,590,674 issued 25 Nov. 2013 discloses a chock system having a secondary restraint mounted within the wheel chock that can lock it onto a base plate. The secondary restraint can be operated manually or by a motor assembly, for instance using an electric motor, a hydraulic motor or a pneumatic motor. The concept proposed in this document can provide a higher level of security, but it may not address all possible concerns. For instance, the secondary restraint could still be put in a locked position even if the wheel chock is not at an appropriate position on the base plate or if it is not on a base plate. Motorized versions can be very difficult to unlock in case of an electrical power outage or if another source of power is interrupted for some reason. They can also be significantly slower to operate compared to the manual ones and this can be a factor when most of the users are in a hurry or are otherwise not always willing to wait for the second restraint to be in a locked state. Still, manually operated versions can sometimes be accidently disengaged simply by bumping into or by otherwise touching the lever inadvertently.

There is still a need for a wheel chock having a locking arrangement that includes one or more desirable features such as simplicity of operation when locking or unlocking the wheel chock, rapidity of movement, added security by preventing the wheel chock from being considered locked if it is not positioned correctly onto an appropriate base plate, and added security during use by preventing the wheel chock from being inadvertently unlocked, to name just a few.

Overall, there is still room for further improvements in this area of technology.

SUMMARY

In one aspect, there is provided a wheel chock for use over a ground-anchored base plate in a restraint system to prevent a parked vehicle from moving away in an unauthorized or accidental manner in a departure direction when the wheel chock is in a tire-blocking position on the base plate, the base plate having a plurality of spaced-apart blocking elements and each blocking element having opposite first and second sides, the wheel chock having a tire-facing side to be positioned directly in front of a tire of a wheel of the parked vehicle, the wheel chock including: a main body; a plurality of spaced-apart first teeth provided underneath the wheel chock to engage the first side of at least one of the blocking elements of the base plate in a latched engagement when the wheel chock is in the tire-blocking position on the base plate; and a locking mechanism including: a positioning unit located inside the main body and movable between an unlocked position and a fully locked position, the positioning unit having at least one second tooth provided underneath to engage the second side of a corresponding one of the blocking elements in a latched engagement when the positioning unit is in the fully locked position, the at least one second tooth being out of engagement with the blocking elements when the positioning unit is in the unlocked position; first means for moving the positioning unit from the unlocked position towards the fully locked position; and second means for selectively holding the positioning unit in the fully locked position, the second means being located inside the main body.

In another aspect, there is provided a wheel chock including a locking mechanism, as described, shown and/or suggested herein.

In another aspect, there is provided a method of restraining a wheeled vehicle using a wheel chock as described, shown and/or suggested herein.

More details on the various aspects, features and advantages of the proposed concept can be found in the following detailed description and the appended figures.

DETAILED DESCRIPTION

Figure 1:
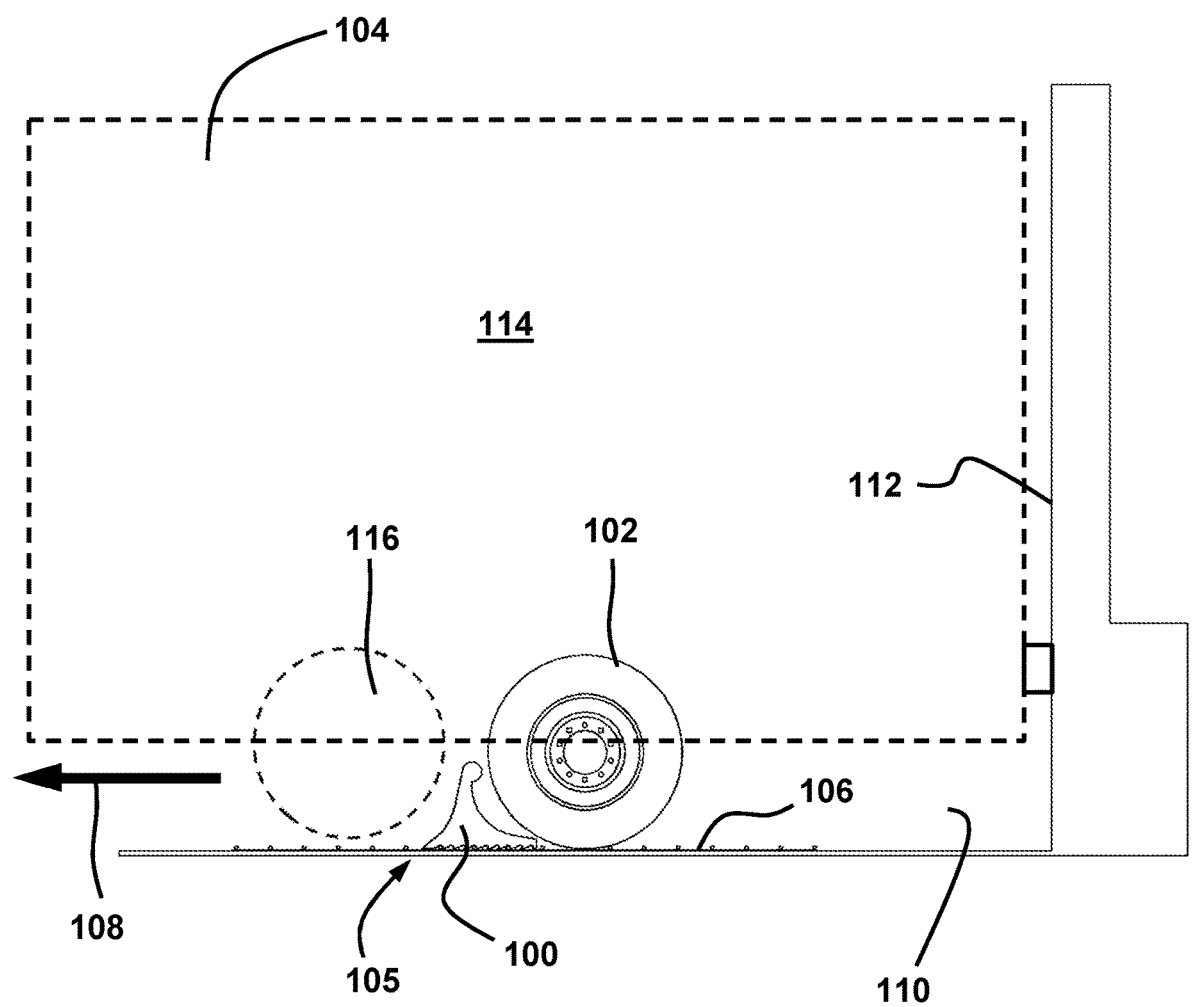
FIG. 1 is a semi-schematic side view illustrating an example of a wheel chock located in front of a wheel of a generic vehicle.

FIG. 1 is a semi-schematic side view illustrating an example of a wheel chock 100 located in front of a wheel 102 of a generic vehicle 104, in this case a truck trailer designed to be hauled by a truck tractor. This is only one among a multitude of possible uses for the wheel chock 100.

The wheel chock 100 is part of a restraint system 105 for preventing the vehicle 104 from moving away in an unauthorized or accidental manner. The wheel chock 100 is designed to be positioned directly in front the wheel 102 over a ground-anchored base plate 106. The wheel chock 100 is in a tire-blocking position in FIG. 1 and prevents the vehicle 104 from moving in a direction of departure 108. The base plate 106 is rigidly attached to the ground, for instance using bolts or any other suitable arrangement. The base plate 106 is also part of the restraint system 105.

The wheel chock 100 has an overall wheel chock height and an overall wheel chock length. The chock length is the horizontal dimension in the longitudinal direction, thus in a direction that is parallel to the departure direction 108. The transversal direction is the horizontal dimension that is perpendicular to the longitudinal direction. It should be noted that the departure direction 108 may not always be the forward direction for all vehicles since some wheel chocks may need to be positioned behind a wheel instead of being positioned in front of it.

The wheel chock 100 creates an obstacle that must be removed only at the appropriate moment, for instance by the driver of the vehicle 104 and after the vehicle 104 was authorized to leave. The wheel chock 100 is otherwise left in position immediately in front of the wheel 102 to block it, thereby preventing the whole vehicle 104 from moving. If desired, the wheel chock 100 can be connected to an articulated spring-assisted arm in some implementations. In others, it can simply be moved by hand, for instance using a handle or the like provided on the wheel chock 100. Other arrangements and configurations are possible as well.

The vehicle 104 in the example of FIG. 1 is shown as being parked at a loading dock 110 and its rear side is adjacent to the wall 112 located at the end of the loading dock 110. It can rest against a cushion or the like, as shown schematically in FIG. 1. The wall 112 can be part of a commercial building, for instance a warehouse, a distribution center or the like. Variants are possible as well. The vehicle 104 includes a cargo compartment 114. Access into the cargo compartment 114 can be made, for instance, using a rear door, which rear door is positioned in registry with a corresponding garage door on the wall 112 when the vehicle 104 is parked at the loading dock 110. The floor of the cargo compartment 114 and the floor of the corresponding building are often at the same height or at a similar height so that a lift truck or the like can load or unload the cargo therein. A ramp can also be used between both floors if the height difference is too important. Other variants are also possible.

It should be noted that the proposed concept can be implemented on wheel chocks for vehicles that are not truck trailers, including vehicles unrelated to the transport industry. Likewise, loading docks are not the only locations where wheel chocks can be provided. For instance, wheel chocks can be used with vehicles located in parking areas, truck stops, etc.

In the example illustrated in FIG. 1, the wheel chock 100 is shown as being positioned between the wheel 102 and an adjacent wheel 116 located immediately in front of the wheel 102. The wheel 102 and the adjacent wheel 116 can be part of a tandem axle arrangement. Other kinds configurations and arrangements are possible as well.

Many truck trailers have a dual wheel arrangement where two wheels positioned side-by-side at each end of each axle. In this case, the word "wheel" used in the context of the wheel chock 100 refers to the exterior wheel and/or the interior wheel. Most implementations will have the wheel chock 100 in position with only one of the wheels at a time, often the exterior wheel because of its proximity with the side of the vehicle. However, some could position the wheel chock 100 simultaneously in front of the two side-by-side wheels in some situations, or even only in front of the interior wheel in some others. It is thus intended that the word "wheel" in a singular form means either only one of the side-by-side wheels or both side-by-side wheels simultaneously in the context of a dual wheel arrangement.

Figure 2:
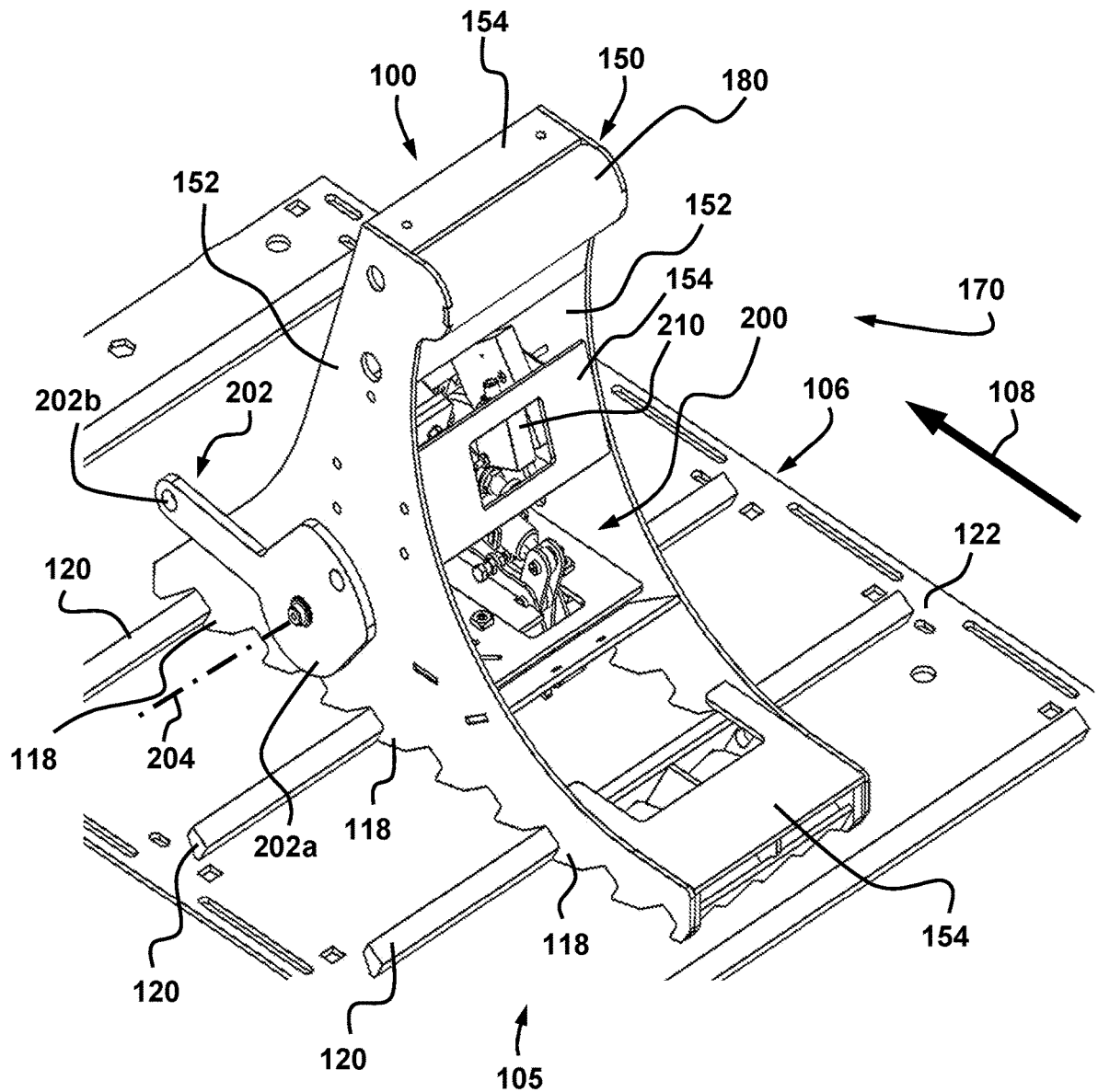
FIG. 2 is an isometric view illustrating an example of a wheel chock in which the present concept is implemented.

FIG. 2 is an isometric view illustrating an example of a wheel chock 100 in which the present concept is implemented. The wheel chock 100 is shown when appropriately installed on the base plate 106. The base plate 106 includes a plurality of blocking elements 120, also sometimes referred to as teeth, which are in the form of transversally-disposed bars in the illustrated example. These blocking elements 120 are spaced apart from one another along the longitudinal direction 108 and they project above the top surface of a main plate member 122. The blocking elements 120 are configured and disposed to hold the wheel chock 100 in the departure direction 108. For the sake of simplicity, FIG. 2 only partially shows one section of the base plate 106. The base plate 106 is generally made of a plurality of sections positioned end-to-end. Other configurations and arrangements are possible as well.

The underside of the wheel chock 100 includes a plurality of teeth 118 provided for engaging corresponding ones of the blocking elements 120 provided on the upper side of the base plate 106. Each blocking element 120 provides opposite side surfaces against which corresponding teeth 118 of the wheel chock 100 can abut so as to create a wheel-blocking engagement in one direction or another, depending on the orientation of the wheel chock 100 on the base plate 106. These side surfaces can be positioned at an oblique angle on both sides of the blocking elements 120, as shown in the illustrated examples. Other configurations and arrangements are possible as well.

The teeth 118 are substantially downwardly-projecting in the illustrated example but other configurations and arrangements are possible. At least one of the blocking elements 120 will be engaged by one set of teeth 118 under the wheel chock 100 when the wheel chock 100 is in position on the base plate 106. In the illustrated example, the longitudinal spacing between successive blocking elements 120 is larger than that between the successive teeth 118. This allows the position of the wheel chock 100 in the longitudinal direction to be adjusted along the base plate 106 by increments that are smaller than the distance between two successive blocking elements 120, thereby providing a greater flexibility in the adjustment of the position of the wheel chock 100 with reference to the wheel 102. This is generally a desirable feature, but it is possible to design the restraint system 105 without it in some implementations. Other variants are also possible.

The blocking elements 120 and the main plate member 122 can be made of a metallic material, such as steel or an alloy thereof. Other materials are also possible. In the illustrated example, the blocking elements 120 are rigidly attached to the corresponding main plate member 122 by welding. These blocking elements 120 were machined, prior to welding, in order to obtain their final cross section shape as shown. The illustrated blocking elements 120 were welded from the underside of the main plate member 122. They were partially inserted in corresponding transversally-extending slots made across the main plate member 122 before welding. This approach minimizes or even alleviates difficulties created when elements of the base plate 106 interfere with the teeth 118 of the wheel chock 100. Nevertheless, the above-mentioned manufacturing method is optional, and welding is also not the only possible method for rigidly attaching the blocking elements 120 to the main plate member 122. Other manufacturing methods and processes are possible. Other configurations and arrangements for the base plate 106 are possible as well.

The wheel chock 100 includes a main body 150. The main body 150 is the rigid supporting structure of the wheel chock 100. It is designed for resisting the forces applied on the wheel chock 100 by the wheel 102 of the vehicle 104 in the case of an unexpected departure attempt in the departure direction 108. The main body 150 of the illustrated wheel chock 100 has a monolithic construction and at least a majority of its parts are made of a strong rigid material, for instance steel or an alloy thereof. Using other materials and configurations is also possible.

It should be noted that in the present context, the expression "monolithic construction" means that there are no moving or easily detachable structural parts once the main body 150 is fully assembled. Hence, the main body 150 does not have a foldable construction when it has a monolithic construction. Additional components can be added to the main body 150, if desired and/or required, but a monolithic main body does not require any movable parts to cooperate with the base plate 106 and to block the wheel 102 in the departure direction 108. Advantages of having a monolithic construction include maximizing the simplicity of use, improving strength due to the absence of hinges or the like, particularly where the highest stresses can occur in use, and minimizing the manufacturing costs. Nevertheless, variants are possible as well. For instance, the main body 150 could have a construction that is not monolithic in some implementations.

In the illustrated example, the main body 150 of the wheel chock 100 includes two spaced-apart main side members 152. The side members 152 can be in the form of substantially vertically-extending plates but variants are also possible. They can be rigidly connected together using, for instance a plurality of transversal members 154 that are welded or otherwise rigidly attached to the side members 152 to create a hollow structure. Variants are possible. The teeth 118 on the underside of the illustrated wheel chock 100 are machined along the bottom edge of each side member 152. Each blocking element 120 with which the wheel chock 100 is engaged will be in a latched engagement simultaneously with two spaced-apart teeth 118 located at the same longitudinal position along the wheel chock 100. Each of these teeth 118 projects under a respective one of the side members 152. Other configurations and arrangements are possible in some implementations. For instance, the wheel chock 100 can be constructed without two side members 152 and the teeth 118 can be located elsewhere.

The illustrated wheel chock 100 includes a wheel-facing side 170. The wheel-facing side 170 is the side that is adjacent to a wheel, for example the wheel 102 in FIG. 1, when the illustrated wheel chock 100 is in position. Using a double-sided wheel chock or a wheel chock having a completely different construction is possible as well.

The wheel-facing side 170 of the illustrated wheel chock 100 is greatly recessed so as to provide a tire deformation cavity located immediately below a wheel-engaging bulge 180 for use with vehicles with tires. This wheel-engaging bulge 180 is generally located at a top end of the wheel chock 100. It provides the main engagement point on which a corresponding tire will exert most of its pressing force against the wheel chock 100 in the event of a premature or otherwise unexpected departure. The wheel-engaging bulge 180 has a non-puncturing shape to prevent tire from being punctured or be otherwise damaged. It can include a smooth and continuous rounded convex surface extending transversally, as shown. Variants are possible as well. For instance, the wheel-engaging bulge 180 can be more or less triangular in profile, with a rounded tip. Many other shapes are possible. When viewed from the side, the wheel-engaging bulge 180 has a profile including a top surface portion and a bottom surface portion. The approximate medial line at the boundary between these top and bottom surface portions will engage the tire tread at the initial stage. Still, one can design the wheel chock 100 without any bulge 180 or similar feature.

The wheel chock 100 of the proposed concept includes a locking mechanism 200. In the illustrated example, the locking mechanism 200 is manually operated using a lever 202 located on one of the lateral sides of the wheel chock 100. Besides the lever 202, other main parts of the locking mechanism 200 are generally located in the hollow space inside the main body 150 of the wheel chock 100. The lever 202 can pivot around a transversal pivot axis 204 to activate the locking mechanism 200 using, for instance, foot pressure. The default state of the locking mechanism 200 is an unlocked state. Once all forces are released, the locking mechanism 200 will automatically get back to the default state. Once in a locked state, the locking mechanism 200 will prevent someone from easily removing the wheel chock 100 from the base plate 106 unless the locking engagement is released. The teeth 118 of the wheel chock 100 will be urged against the blocking elements 120 in the departing direction 108 and the locking mechanism 200 will generate a force preventing any movement of the wheel chock 100 in the opposite direction.

The lever 202 in the illustrated example includes an enlarged base 202a and an elongated shank 202b radially extending from the edge of the base 202a. The lever 202 has a relatively flat shape and it extends parallel to the outer surface of the corresponding side member 152. The free end of the illustrated shank 202b includes a hole where a transversal rod or another similar feature (not shown) can be provided for use as a foot pedal. This feature can be omitted in some implementations. The lever 202 can also be used without any additional feature. Different configurations and arrangements are possible as well. Still, the lever 202 can be operated by hand in some implementations or in some circumstances. It can be omitted in others.

FIG. 2 also shows that the illustrated wheel chock 100 includes a wheel sensor 210 located inside the main body 150. This wheel sensor 210 is provided to detect the presence of the wheel 102 of the vehicle 104, for instance the proximity of the tire thread. The detection can be based on an optical arrangement or any other suitable technology, including mechanical ones. The wheel sensor 210 is positioned in registry with an opening provided on a corresponding one of the transversal members 154. The wheel sensor 210 is useful, among other things, to prevent the wheel chock 100 from being positioned with the wrong orientation, namely backward with reference to the wheel 102. Other configurations and arrangements are possible. The wheel sensor 210 can also be omitted in some implementations.

Figure 3:
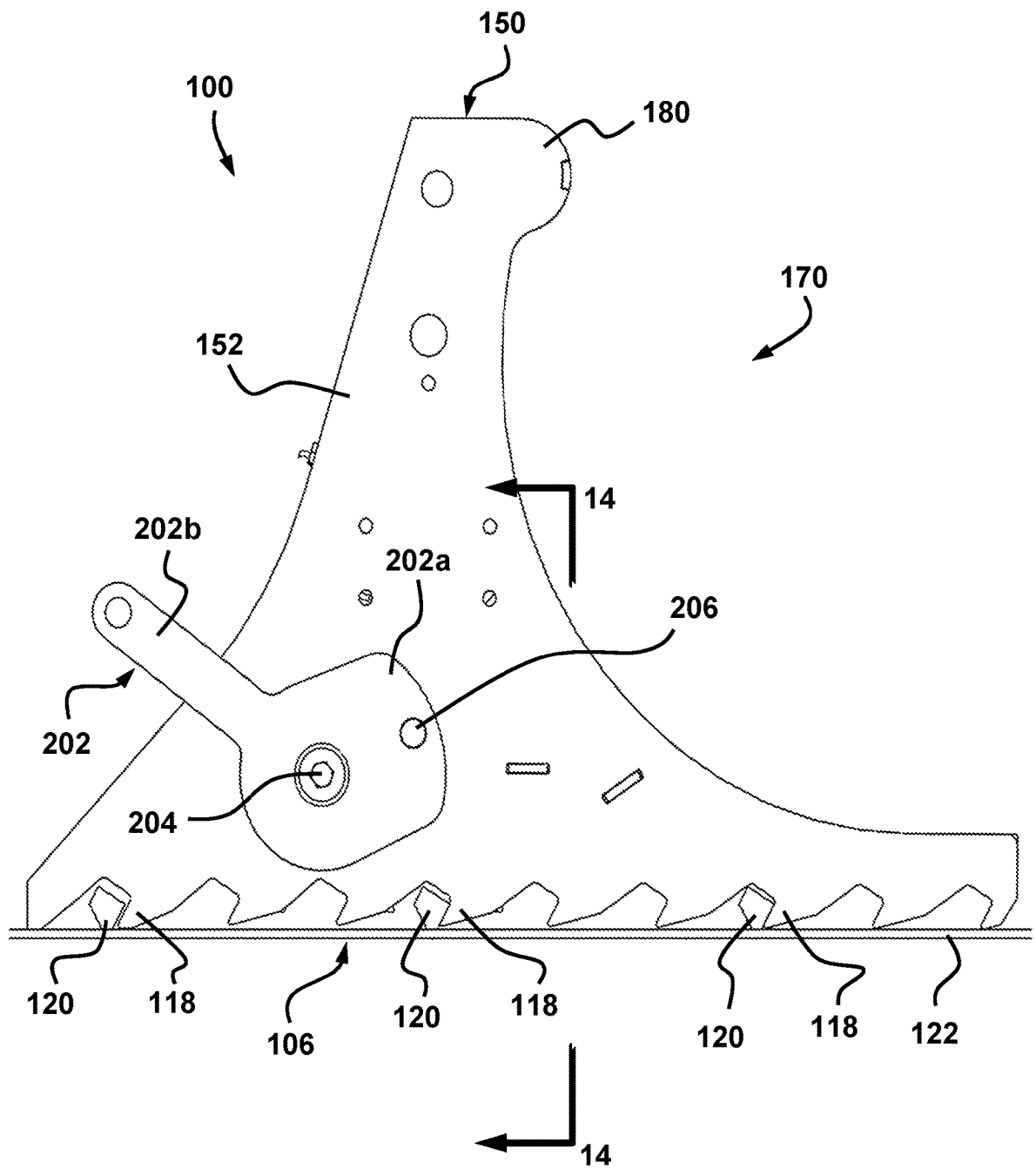
FIG. 3 is a side view illustrating the wheel chock of FIG. 2 when the locking mechanism is unlocked.

FIG. 3 is a side view illustrating the wheel chock 100 of FIG. 2 when the locking mechanism 200 is unlocked. The free end of the shank 202b of the lever 202 in the illustrated example is then at its highest position from the ground. FIG. 3 also shows that the base 202a of the lever 202 includes a hole in which is located a transversally-disposed peg 206 or the like. The peg 206 extends inwards and into main body 150 of the wheel chock 100 to transfer the force to a positioning unit 212 therein. The peg 206 is freely movable inside an arc-shaped slot 208 (visible in FIG. 34) made on the corresponding side member 152. This slot 208 is coaxially disposed with reference to the pivot axis 204 of the lever 202. The slot 208 can be used to limit the range of the pivoting motion for the lever 202. One can also use other arrangements to limit the range of the pivoting motion or omit this feature entirely. Other configurations or arrangements are possible as well.

FIG. 3 shows that in the illustrated example, the wheel chock 100 has three sets of teeth 118 engaging a first side of three corresponding blocking elements 120 in a latched engagement. Variants are possible. For instance, the wheel chock 100 can have fewer or even more sets of teeth 118 engaging blocking elements 120.

Figure 4:
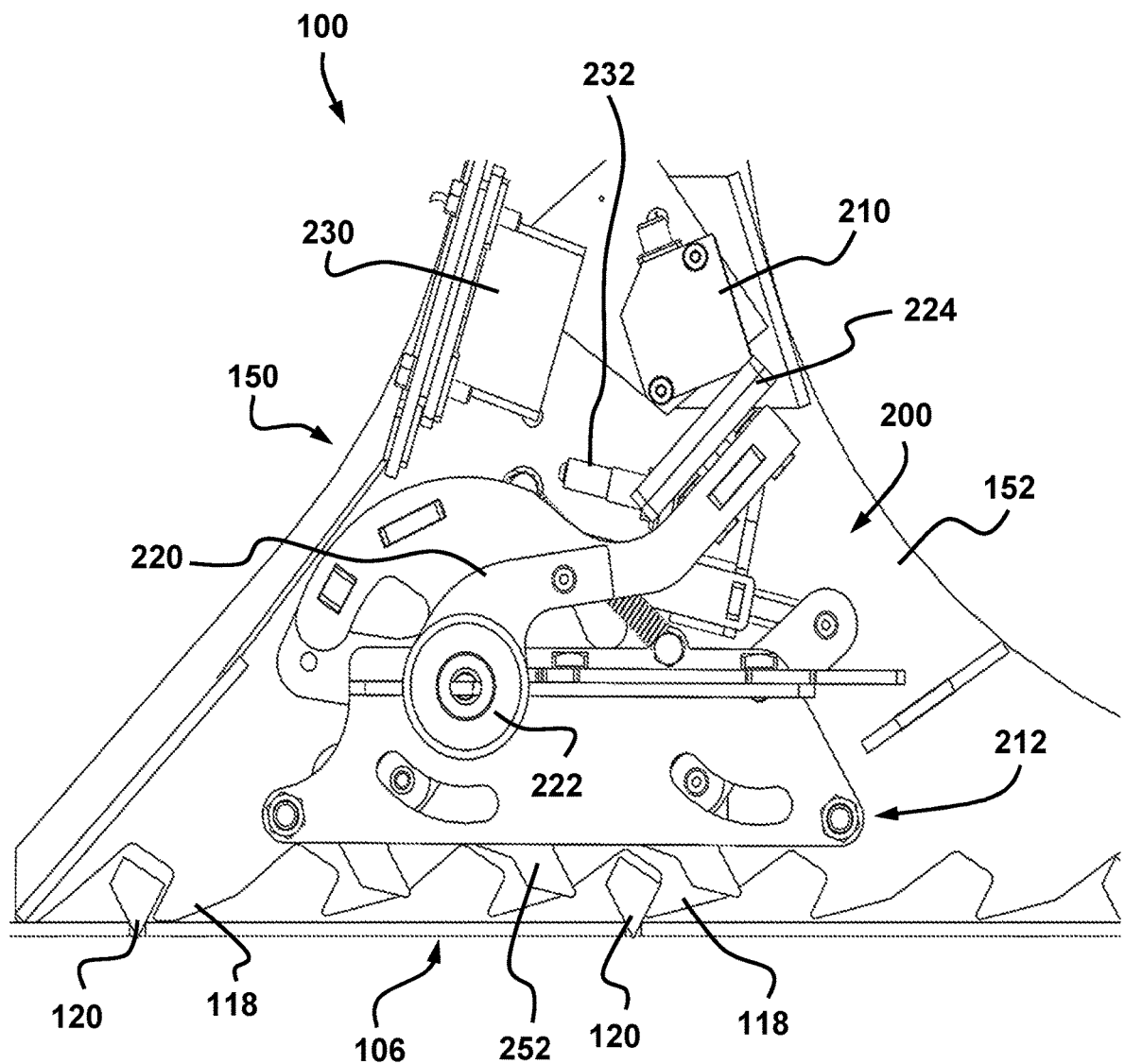
FIG. 4 is a longitudinal cross section view of the wheel chock shown in FIG. 3.

FIG. 4 is a longitudinal cross section view of the wheel chock 100 shown in FIG. 3. This figure illustrates the interior of the wheel chock 100 of FIG. 3 once the lever 202 and the adjacent side member 152 were removed for the sake of illustration, thereby exposing the parts of the locking mechanism 200 that are inside the main body 150. The locking mechanism 200 includes fixed parts and mobile parts. The fixed parts are rigidly attached inside the main body 150. Other configurations and arrangements are possible.

The locking mechanism 200 of this example includes a main arm 220 pivotally mounted around a first bearing assembly 222. This bearing assembly 222 is coaxial with the pivot axis 204 of the lever 202 but using another configuration or arrangement is possible in other implementations. The lever 202 can be pivotally connected to the wheel chock 100 using the same bearing assembly 222 or a different one. However, the lever 202 and the main arm 220 are not rigidly connected to one another in the illustrated example. This is generally desirable to prevent someone from directly applying an external force on the lever 202 without knowing that the locking mechanism 200 is already in a locked state. The motion from the lever 202 in the illustrated example is transferred to the main arm 220 using the peg 206, as shown for instance in FIG. 12. Nevertheless, other configurations and arrangements are possible in some implementations, including having the lever 202 and the main arm 220 constantly in a torque-transmitting engagement.

In the illustrated example, the main arm 220 supports a ferromagnetic plate 224 located at or near the free end thereof. The ferromagnetic plate 224 is designed to cooperate with an electromagnet 230 rigidly attached inside the main body 150. This electromagnet system 224, 230 allows to selectively hold the positioning unit 212 in the fully locked position. The ferromagnetic plate 224 is connected to the main arm 220 using an arrangement of connectors that can compensate over a few degrees if the alignment with the electromagnet 330 is not perfect. This feature can be omitted in some implementations.

It should be noted that the position of the electromagnet 230 and that of its corresponding ferromagnetic plate 224 can be inverted in some implementations. Still, the locking mechanism 200 can include another kind of locking arrangement to maintain the locking mechanism 200 in the locked state for as long as it is necessary.

In the illustrated example, the main arm 220 brings the ferromagnetic plate 224 into engagement with the electromagnet 230 only when the positioning unit 212 is at the fully locked position. The electromagnet 230 can then be energized to hold the ferromagnetic plate 224, thereby holding the locking mechanism 200 in a locked state. This electromagnet 230 can otherwise remain inactive when the locking mechanism 200 is an unlocked state and possibly also as long as other conditions are met. Nevertheless, the ferromagnetic plate 224 must be very close to the electromagnet 230 to be caught by it even if the electromagnet 230 is already energized. Other configurations and arrangements are possible.

The locking mechanism 200 of the illustrated example can use signals from various devices mounted on the wheel chock 100 for an added security. One of these devices is the wheel sensor 210 that can detect the presence of the wheel 102 close to the wheel-facing side 170. It is thus possible to design the restraint system 105 so that the wheel chock 100 can only be held in a locked state if it is positioned close to the wheel 102.

Another device is a position detector 232 provided inside the main body 150 to determine if the locking mechanism 200 is indeed the base plate 106 and not, for instance, simply set on the ground floor outside the base plate 106. The position detector 232 in the illustrated example includes a proximity sensor 232a and a target, for instance a flat metallic plate 232b, located in front of the proximity sensor 232a. The position detector 232 measures the gap between the tip of the proximity sensor 232a and the target plate 232b. Other configurations and arrangements are possible. For instance, the position detector 232 can be an induction sensor that triggers when the target plate comes within a given distance, a mechanical switch that triggers upon contact with the target element, or an optical sensor that detects that target is in correct position. Using strain sensors is another possibility. Other configurations and arrangements are possible. The position detector 232 or an equivalent can also be omitted in some implementations, depending for instance on the level of security required.

The position detector 232 is useful to prevent the locking mechanism 200 from being held in a locked state if it is not positioned on the base plate 106. The locking mechanism 200 will then not engage one of the blocking elements 120 and the position detector 232 will detect it because the gap will not be the one expected. The restraint system 105 can be configured to prevent the locking mechanism 200 from becoming locked, even the ferromagnetic plate 224 moves all the way against the electromagnet 230. For instance, the position detector 232 can send a signal to a relay controlling the electric power sent to the electromagnet 230. Other configurations and arrangements are possible.

The position detector 232 in the illustrated wheel chock 100 is positioned on a spring-biased linkage 270 through which is transmitted the force coming from the lever 202 for moving the positioning unit 212 towards its fully locked position. The spring-biased linkage 270 is part of the positioning unit 212. Other configurations and arrangements are possible.

A bias arrangement can be provided to move the positioning unit 212 towards the unlocked position when no force is applied at the lever 202 (i.e., the force being released) and the locking arrangement is no longer active. In the illustrated example, a return force is generated by two spaced-apart and parallel helical springs 280. Again, other configurations and arrangements are possible. Some implementations may even be configured and disposed to use the force of gravity to move the positioning unit 212 towards the unlocked position. Hence, springs and other kinds of biasing arrangements can be omitted in some implementations.

Figure 12:
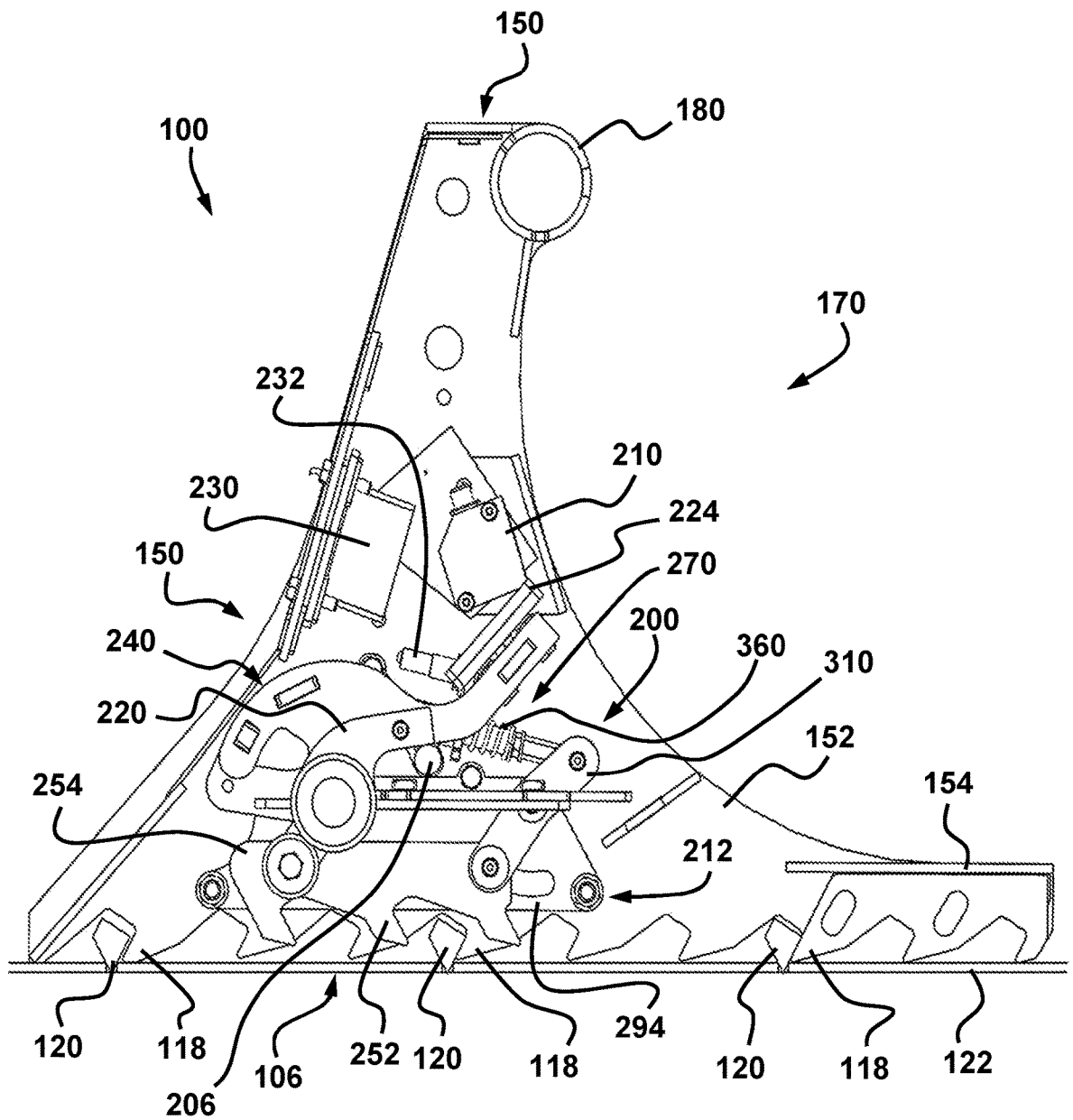
FIG. 12 is a view similar to FIG. 4 but where some of the parts of the locking mechanism were removed for the sake of illustration.

It should be noted that it is possible to include a spring member 368 (FIG. 9), such as a cylindrical spring member made of a highly resistant polymer, inside the spring-biased linkage 270, at a position opposite to the spring 360 (FIG. 12). This can mitigate the damages to the wheel chock 100 in the unlikely event of having a locked wheel chock 100 pushed with an overloading force by a large vehicle but in the direction opposite to the departure direction. The forces applied on the wheel chock 100 by the vehicle will only be opposed by the locking mechanism 200. It will not otherwise affect the measurements at the position detector 232.

In the illustrated example, the main arm 220 is part of a pivoting frame structure 240 generally extending widthwise inside the wheel chock 100. The pivoting frame structure 240 is part of the positioning unit 212. The main arm 220 is parallel to the interior wall surface of one of the side members 152. The pivoting frame structure 240 also includes a secondary arm 242 (FIG. 6) on the opposite side. Other configurations and arrangements are possible.

Figure 5:
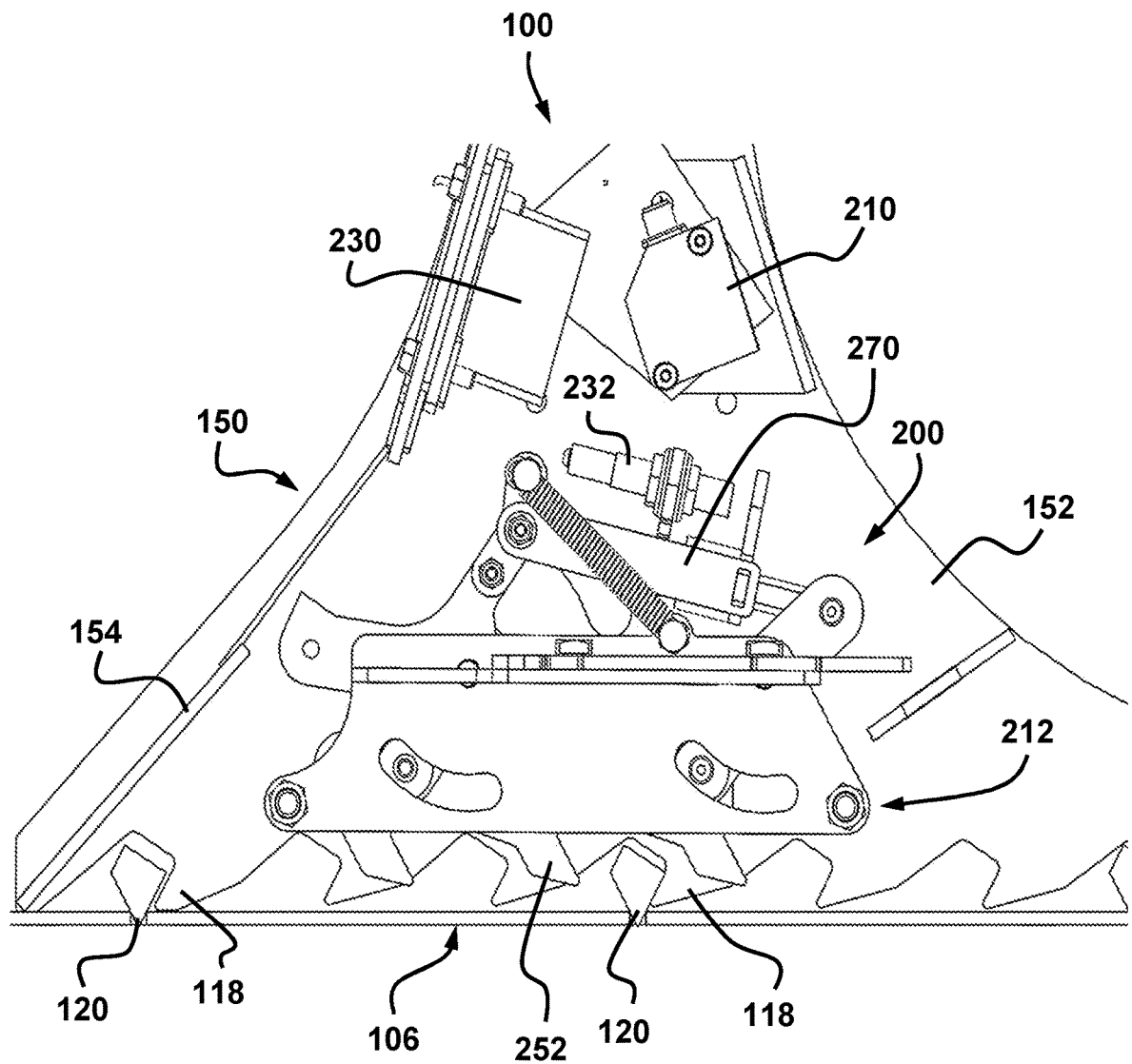
FIG. 5 is a view similar to FIG. 4 but where some of the parts of the locking mechanism were removed for the sake of illustration.

FIG. 5 is a view similar to FIG. 4 but where some of the parts of the locking mechanism 200 were removed for the sake of illustration. The parts removed include those of the pivoting frame structure 240 to reveal other parts inside the positioning unit 212. The positioning unit 212 includes a teeth carrying member 254 (FIG. 11) under which the teeth 252 are provided. The positioning unit 212 moves the teeth 254 in and out of engagement with one side of a corresponding one among the blocking elements 120 of the base plate 106. In the illustrated example, the positioning unit 212 also supports the position detector 232. Other configurations and arrangements are possible.

The teeth 252 of the teeth carrying member 254 in the illustrated example are somewhat similar in shape to the teeth 118 under the main body 150 of the wheel chock 100. They are, however, oriented in the opposite direction. Only one of the teeth 252 needs to engage one of the blocking elements 120 in a latched engagement. Three spaced-apart and substantially downwardly-projecting second teeth 252 are provided in the illustrated example. The teeth 252 are aligned and juxtaposed in a longitudinal row with a spacing that corresponds approximatively to one third of the spacing between two adjacent blocking elements 120. This way, the exact position of the wheel chock 100 on the base plate 106 becomes irrelevant since any one of the teeth 252 can engage a blocking element 120 whenever necessary. Nevertheless, using other configurations and arrangements is possible. For instance, one can use fewer than three teeth 252 in some implementations, even only one, or design the interface between the wheel chock 100 and the base plate 106 completely differently from what is shown and described. The shape of the teeth 254 can be very different from that of the teeth 118 in some implementations. Other variants are possible as well.

Figure 6:
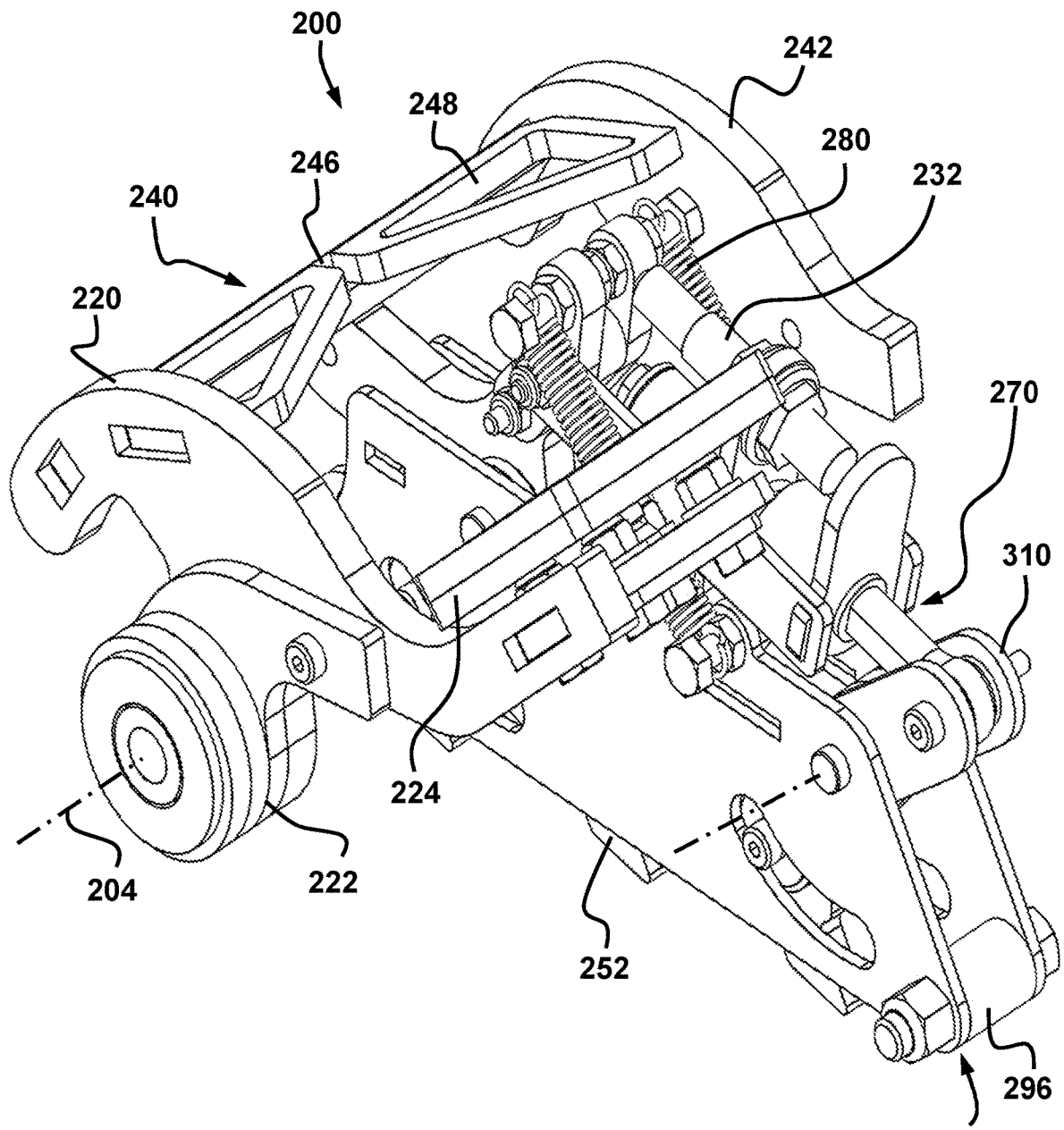
FIG. 6 is an enlarged isometric view of some of the parts of the locking mechanism inside the wheel chock of FIG. 2.
Figure 7:
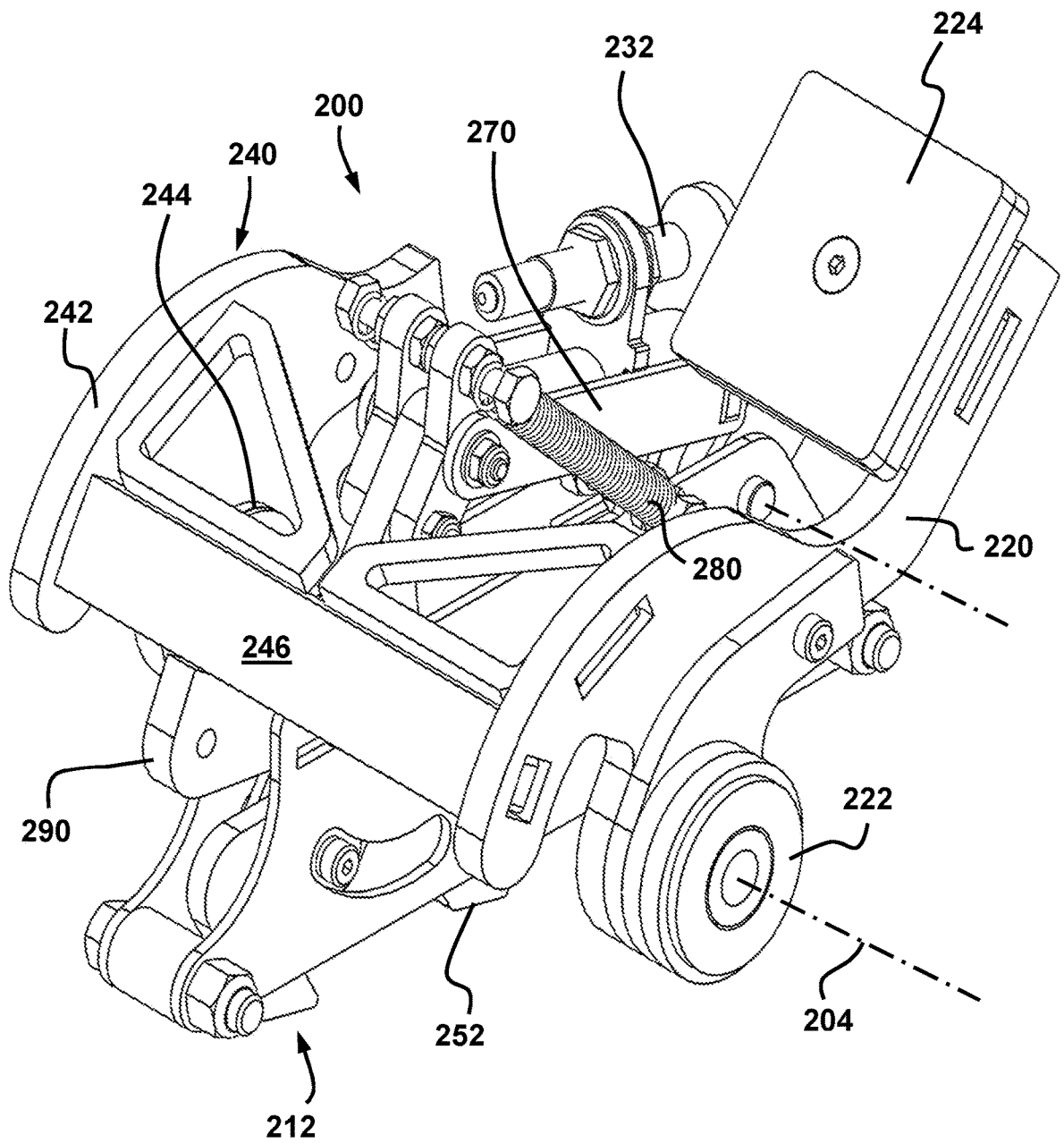
FIG. 7 is a view similar to FIG. 6 but taken from another viewpoint.

FIG. 6 is an enlarged isometric view of some of the parts of the locking mechanism 200 inside the wheel chock 100 of FIG. 2. FIG. 7 is a view similar to FIG. 6 but taken from another viewpoint. Both figures show the same lateral side of the locking mechanism 200. However, they show the pivoting frame structure 240 almost entirely. This pivoting frame structure 240 includes, as aforesaid, the main arm 220 and the secondary arm 242. The secondary bearing assembly is partially visible in FIG. 7 at 244. A rigid transversal bar 246 and a reinforcing substructure 248 are also present to create a torque-transmitting engagement between the main arm 220 and the secondary arm 242 in the illustrated example. These parts pivot together with reference to the pivot axis 204. Still, in this implementation, the bottom edge of the transversal bar 246 is configured and disposed to engage the top edge at the end of a horizontally-disposed lever arm 290. The transversal bar 246 is only in abutment with the lever arm 290. The transversal bar 246 will transmit the force coming from the lever 202 when it is pivoted counterclockwise in FIG. 7. The lever arm 290 can be better seen in FIG. 8. Pressing down on the lever arm 290 will move the teeth carrying member 254 downwards in an arc-shaped motion. The lever arm 290 is substantially L-shaped in the illustrated example. Other configurations and arrangements are possible.

Figure 8:
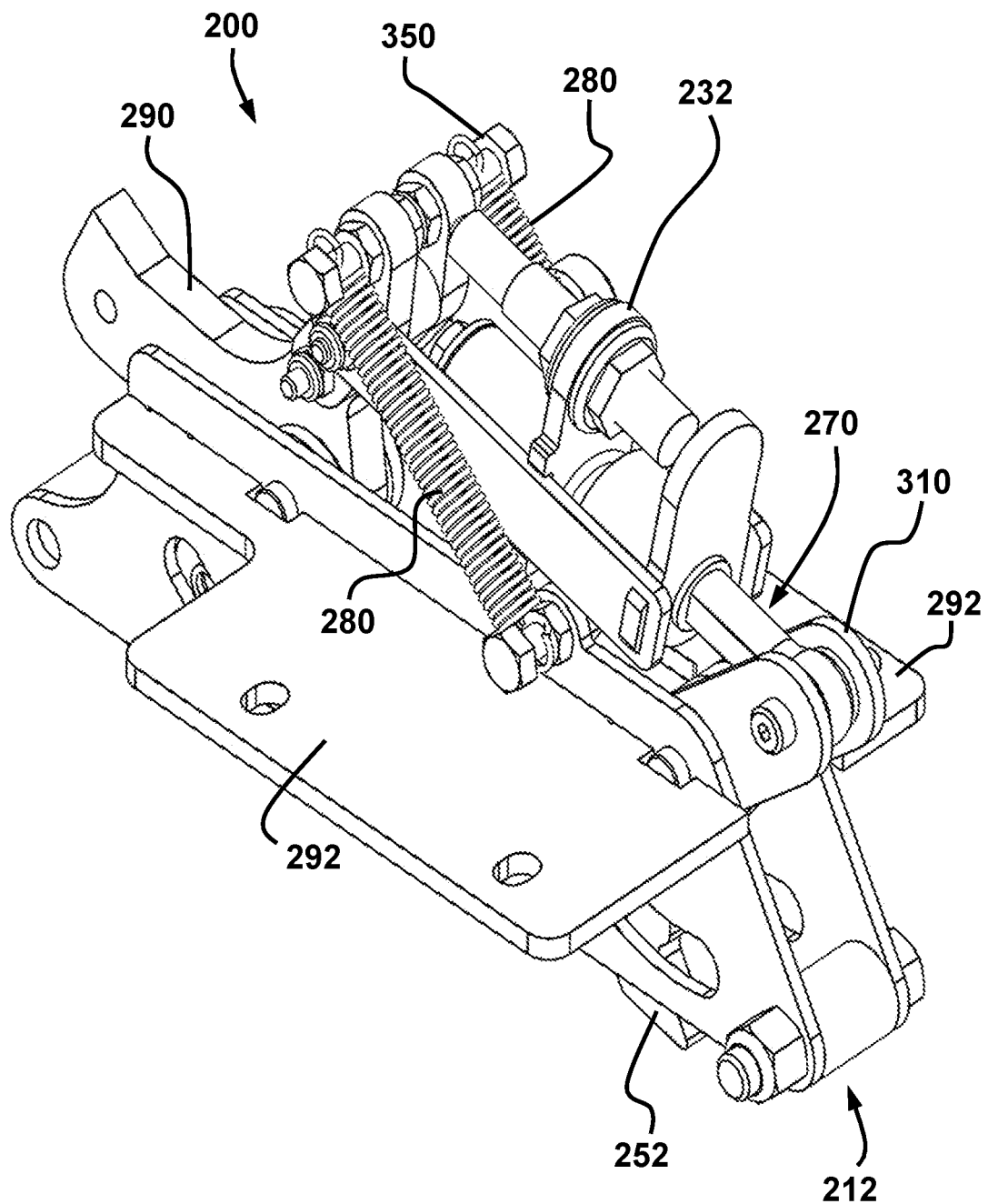
FIG. 8 is an enlarged isometric view of only some of the parts of the locking mechanism illustrated in FIGS. 6 and 7.

FIG. 8 is an enlarged isometric view of only some of the parts of the locking mechanism 200 illustrated in FIGS. 6 and 7. Among other things, the pivoting frame structure 240 is not shown in FIG. 8. This figure shows the side brackets 292 on each side of the illustrated positioning unit 212. There are provided to rigidly attach this positioning unit 212 inside the main body 150 of the wheel chock 100. The side brackets 292 can also be parts of a larger unitary piece in the main body 150. Other configurations and arrangements are possible.

Figure 9:
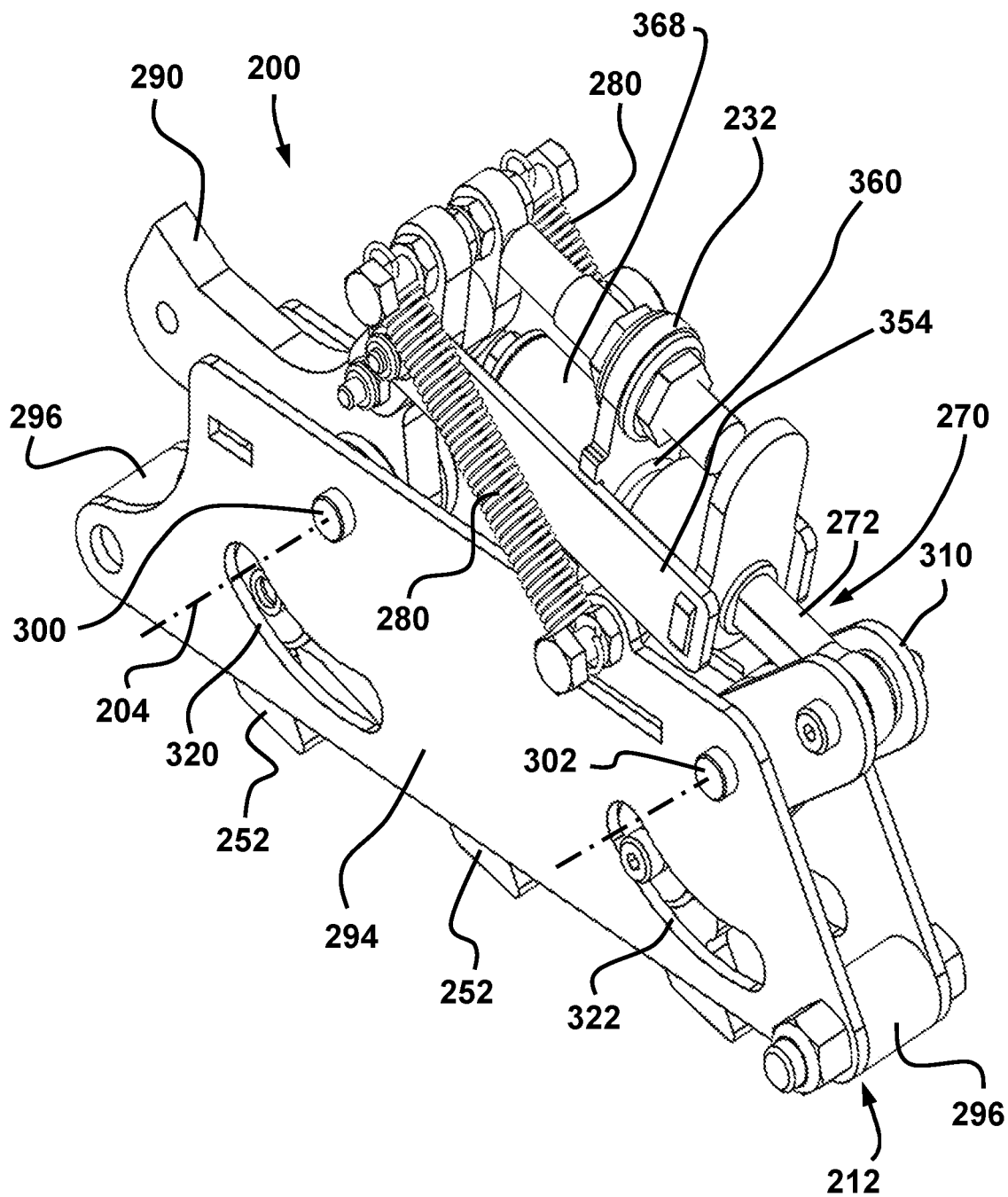
FIG. 9 is a view similar to FIG. 8 but with the side brackets removed for the sake of illustration.
Figure 10:
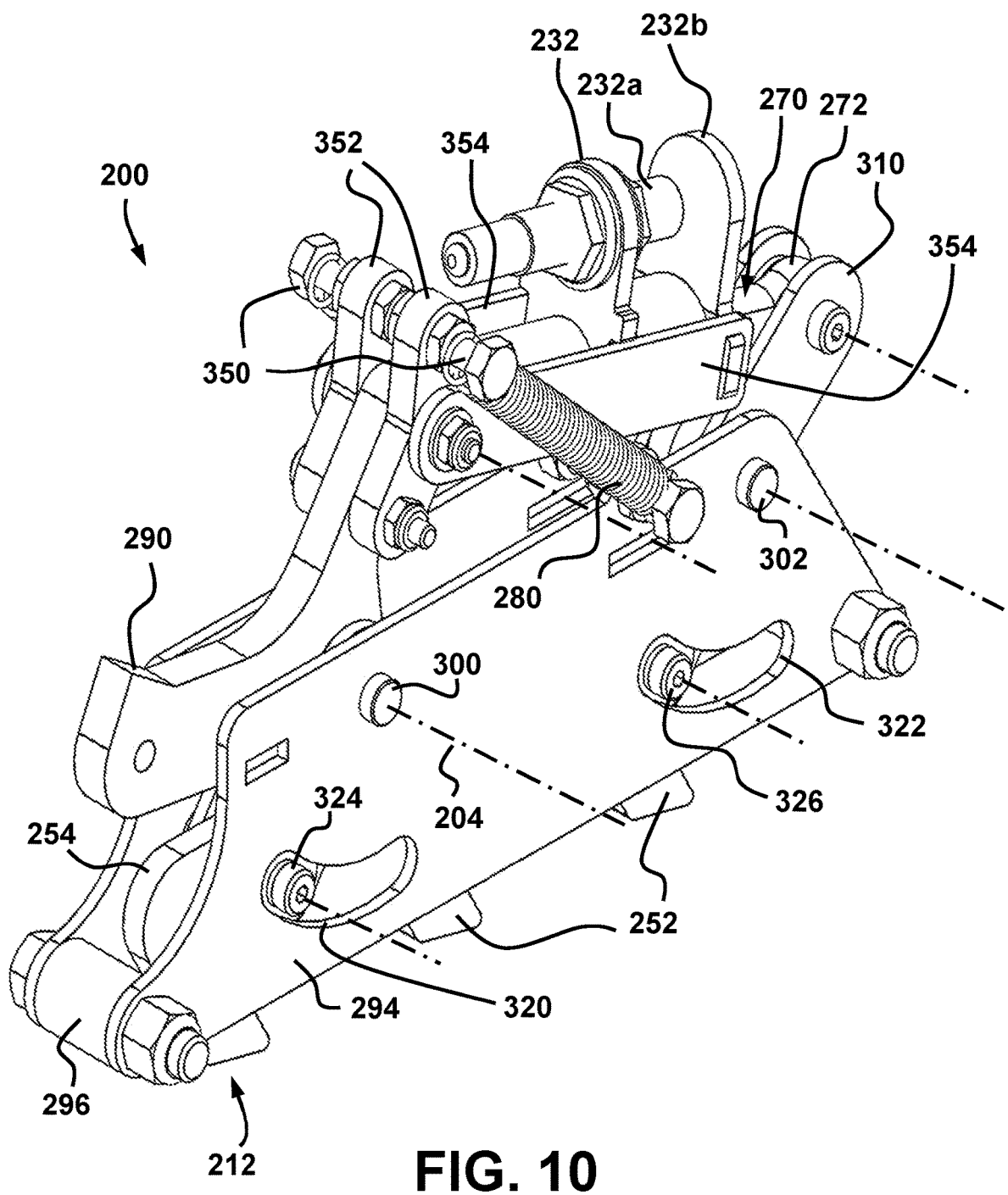
FIG. 10 is a view similar to FIG. 9 but taken from another viewpoint.

FIG. 9 is a view similar to FIG. 8 but with the side brackets 292 removed for the sake of illustration. FIG. 10 is a view similar to FIG. 9 but taken from another viewpoint, namely from the opposite side. As can be seen, the positioning unit 212 of the illustrated example includes two longitudinally-extending vertical supporting side plates 294. These side plates 294 are parallel and spaced apart from one another. Among other things, spacers 296 are used at both ends. The side plates 294 provide mounting points for the bottom end of the return springs 280 since they are fixed parts. Other configurations and arrangements are possible.

The side plates 294 in the illustrated example also support a first transversal axle 300 around which the lever arm 290 is pivotally mounted. The axle 300 is coaxially-disposed with reference to the pivot axis 204. However, this is not essential for the locking mechanism 200 to function. The side plates 294 further support a second transversal axle 302 that is parallel to the first transversal axle 300. A pivot arm 310 is mounted on the second transversal axle 302. This pivot arm 310 is slightly wedge-shaped and extends in the intermediary space between the two side plates 294. The top end of the pivot arm 310 is double sided in the illustrated example and is supported by the second transversal axle 302 at its center. The upper end of the pivot arm 310 is pivotally connected to the free end of the shank 272 of the spring-biased linkage 270. The bottom end of the pivot arm 310 is pivotally connected to the teeth carrying member 254. Other configurations and arrangements are possible.

The illustrated example further includes a pair of arc-shaped slots 320, 322 made on each of the side plates 294. These slots 320, 322 are created essentially to provide free space for mechanical connectors. They can also be useful to restrict the motion of the teeth carrying member 254. The teeth carrying member 254 will not go beyond either one of the end positions using followers 324, 326 (FIG. 10) extending outwardly in a corresponding one of the slots 320, 322. They are configured and disposed to abut at the corresponding ends of these slots 320, 322. Other configurations and arrangements are possible. The slots 320, 322 and the followers 324, 326 can be omitted in some implementations.

FIG. 10 also shows the details on the connections between the lever arm 290, the spring-biased linkage 270 and the return springs 280. As can be seen, the upper ends of each return spring 280 is attached to a transversal screw 350 provided at the upper end of a corresponding holding member 352. These holding members 352 are rigidly attached to the lever arm 290. The lever arm 290 is connected to the spring-biased linkage 270 using a pair of spaced-apart side strips 354 extending longitudinally between the lever arm 290 and the target plate 232*b* of the position detector 232. The other part of the position detector 232 is rigidly attached to the stem 272 of the spring-biased linkage 270. In use, pushing down on the lever arm 290 will pull the spring-biased linkage 270 backwards and this will force the teeth carrying member 254 to pivot, thereby moving it downwards. Other configurations and arrangements are possible.

Figure 11:
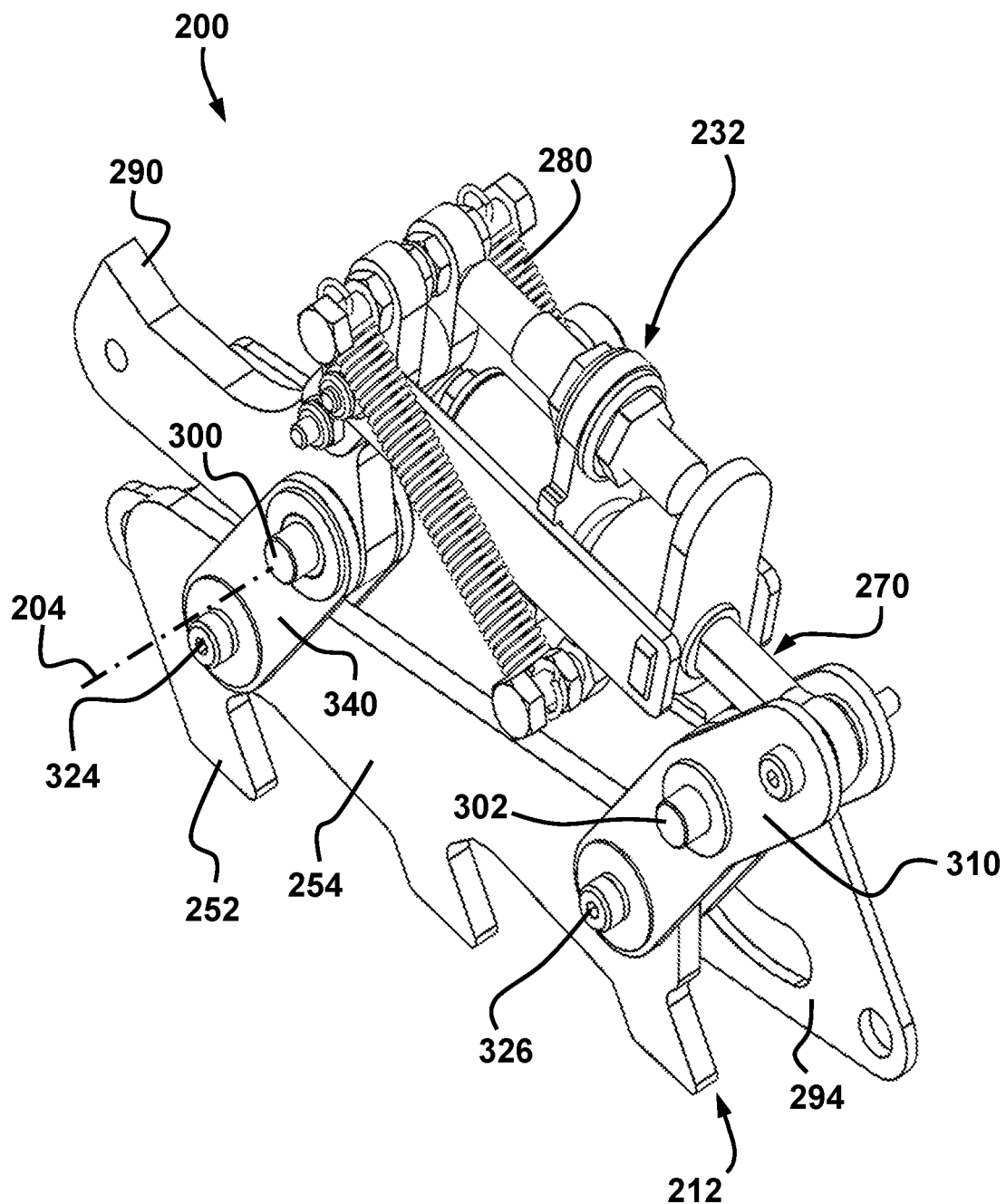
FIG. 11 is a view similar to FIG. 9 but where one of the side plates was removed for the sake of illustration.

FIG. 11 is a view similar to FIG. 9 but where one of the side plates 294 was removed for the sake of illustration. The other one of these plates 294 was left in place. This figure shows the teeth carrying member 254 almost entirely. It also shows the double-sided support arm 340 that is pivotally mounted to the first transversal axle 300 at its upper end. This support arm 340 is thus mounted on the same axle 300 as the lever arm 290 but it is not directly in a torque-transmitting engagement. The downward motion of the lever arm 290 to only transmitted to the teeth carrying member 254 via the spring-biased linkage 270 and the pivot arm 310. Other configurations and arrangements are possible.

FIG. 12 is a view similar to FIG. 4 but where some of the parts of the locking mechanism 200 were removed for the sake of illustration. A portion of the spring-biased linkage 270 was removed to show the helical spring 360 provided therein in the illustrated example. This spring 360 is located between the proximity sensor 232*a* and the target plate 232*b*. Other configurations and arrangements are possible as well.

FIG. 12 shows the peg 206 engaging the front side edge of the main arm 220. This creates a unidirectional force-transmitting engagement between the lever 202 and the side of the main arm 220 when the lever 202 is pivoted counterclockwise in the illustrated example. As aforesaid, there is no other torque-transmitting engagement between them in this implementation and the lever 202 can return to its original position even if the locking mechanism 200 is in a locked state thereafter. Nevertheless, other configurations and arrangements are possible.

Figure 13:
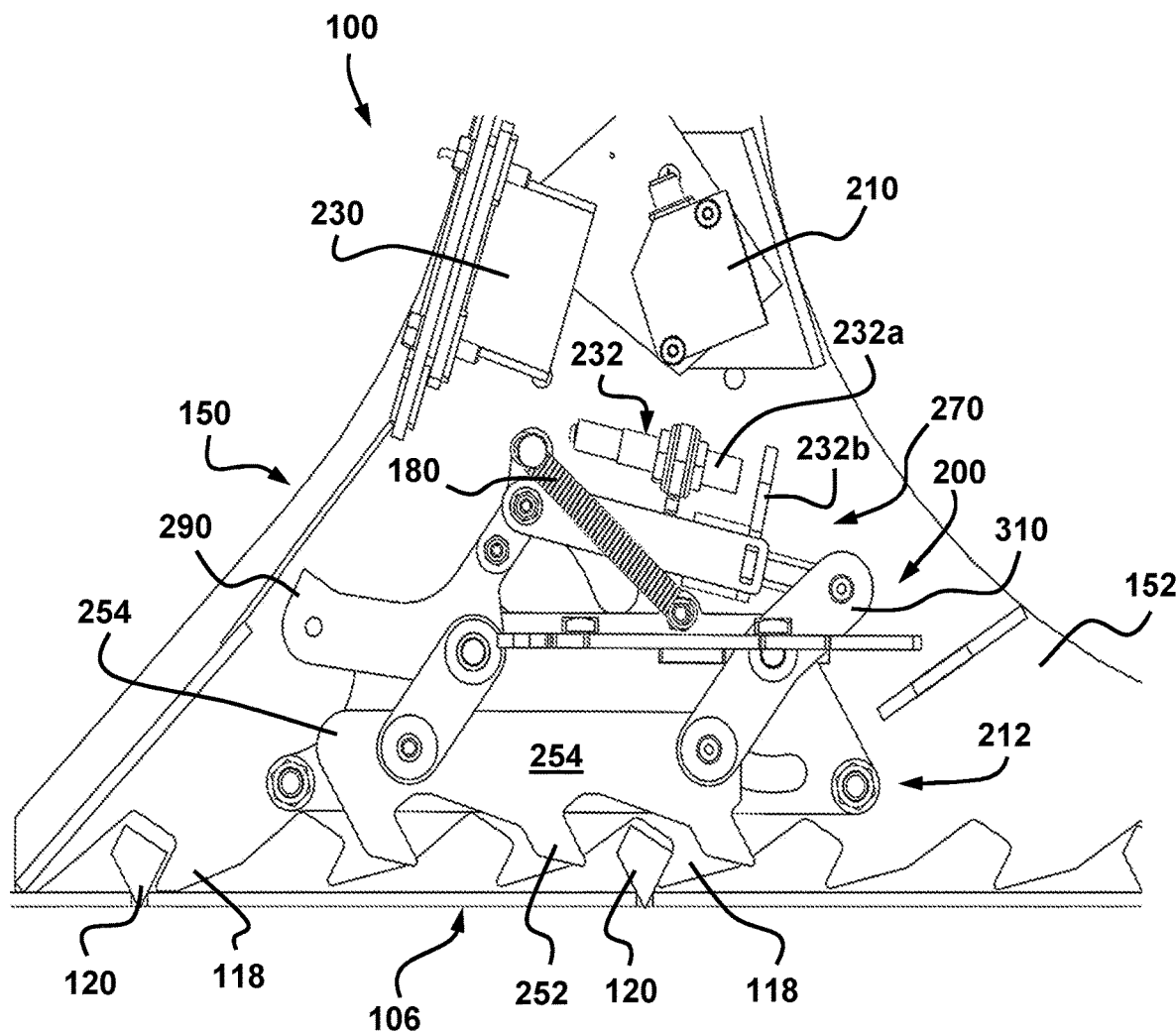
FIG. 13 is an enlarged view of what is shown in FIG. 12 where additional parts of the locking mechanism were removed for the sake of illustration.
Figure 14:
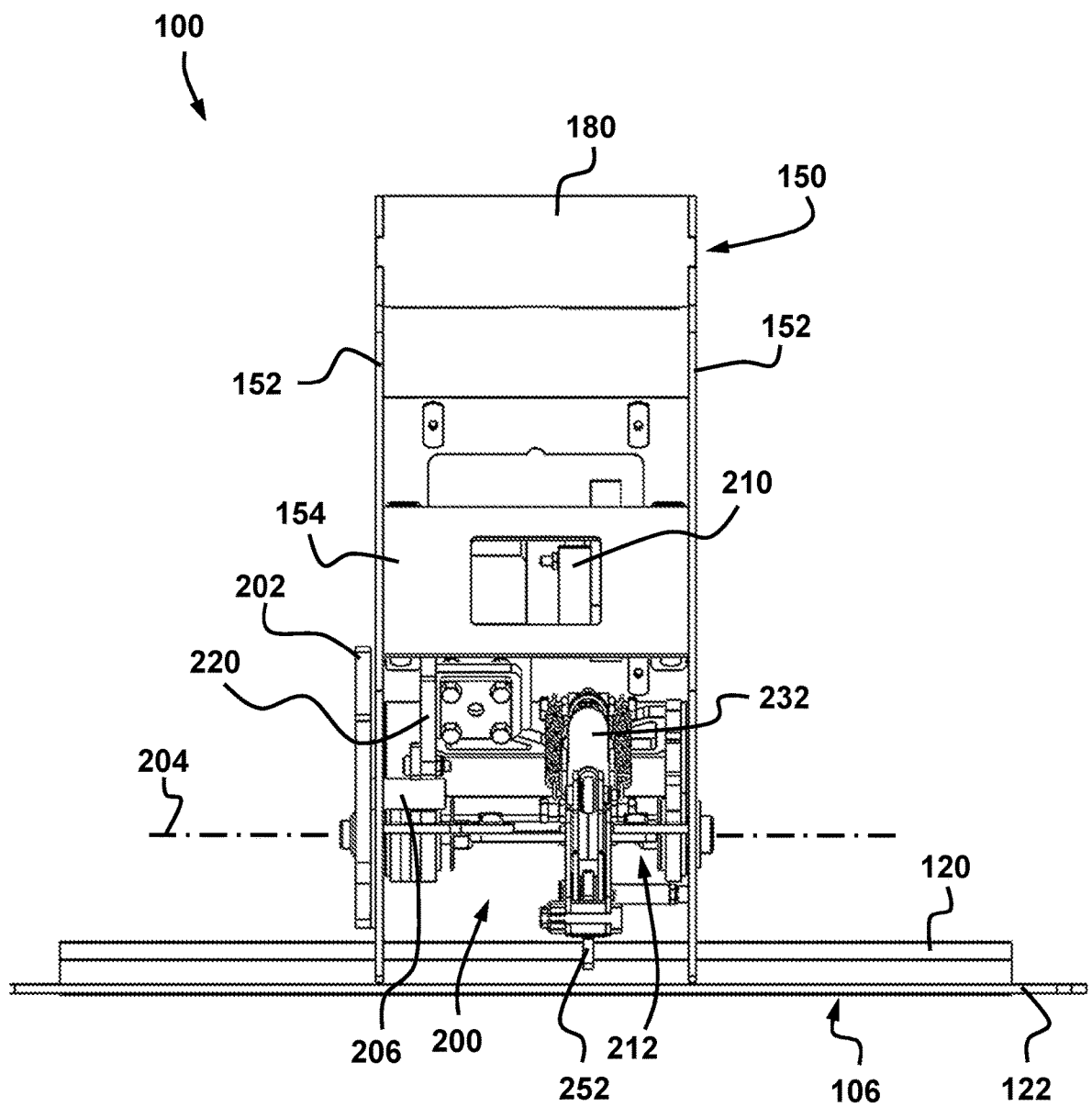
FIG. 14 is a transversal cross section view of the wheel chock taken along line 14-14 in FIG. 3.

FIG. 13 is an enlarged view of what is shown in FIG. 12 where additional parts of the locking mechanism 200 were removed for the sake of illustration. FIG. 14 is a transversal cross section view of the wheel chock 100 taken along line 14-14 in FIG. 3.

Figure 15:
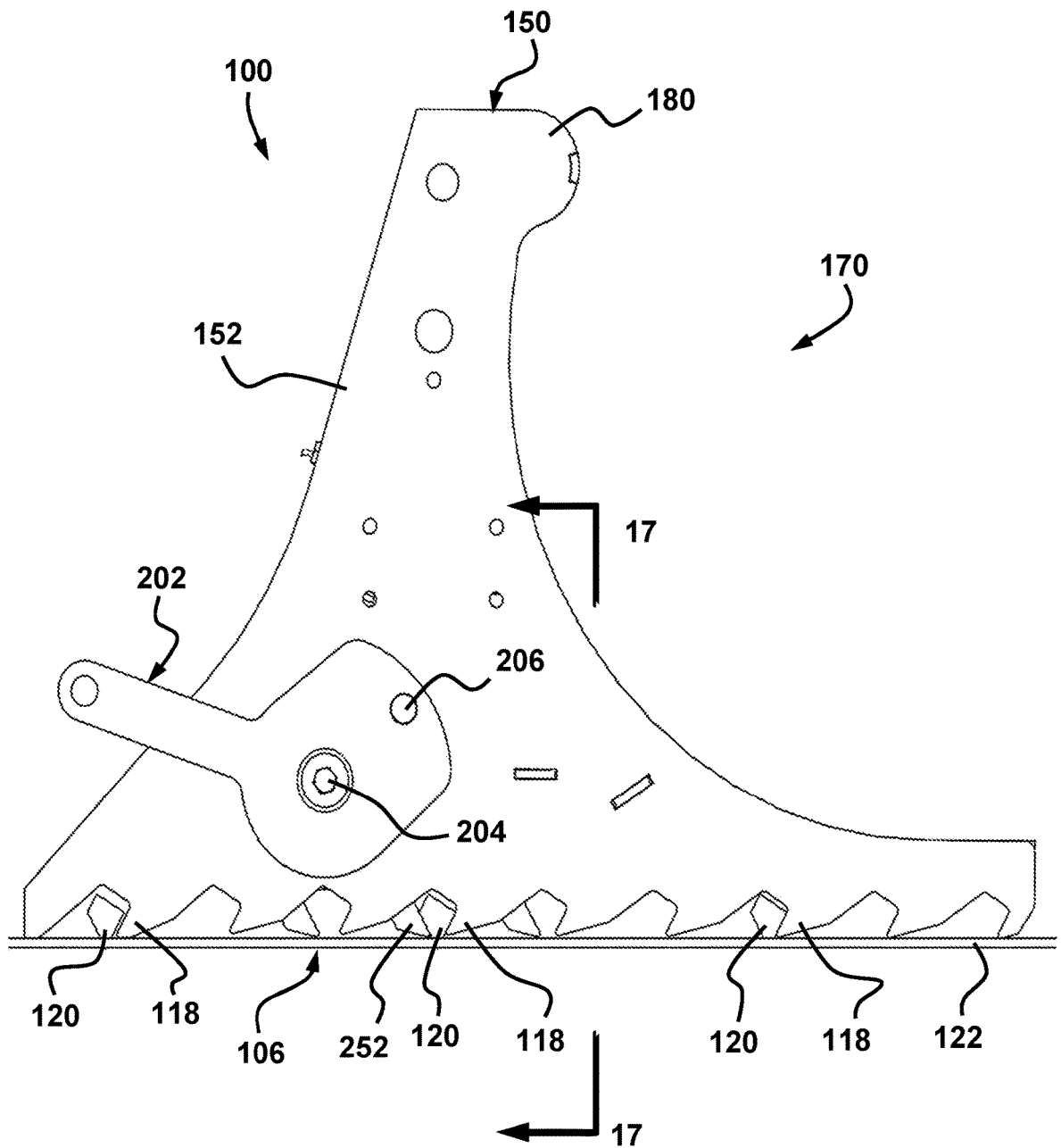
FIG. 15 is a side view illustrating the wheel chock of FIG. 2 when the positioning unit is about halfway between the unlocked position and the fully locked position.

FIG. 15 is a side view illustrating the wheel chock 100 of FIG. 2 when the positioning unit 212 is about halfway between the unlocked position and the fully locked position.

Figure 16:
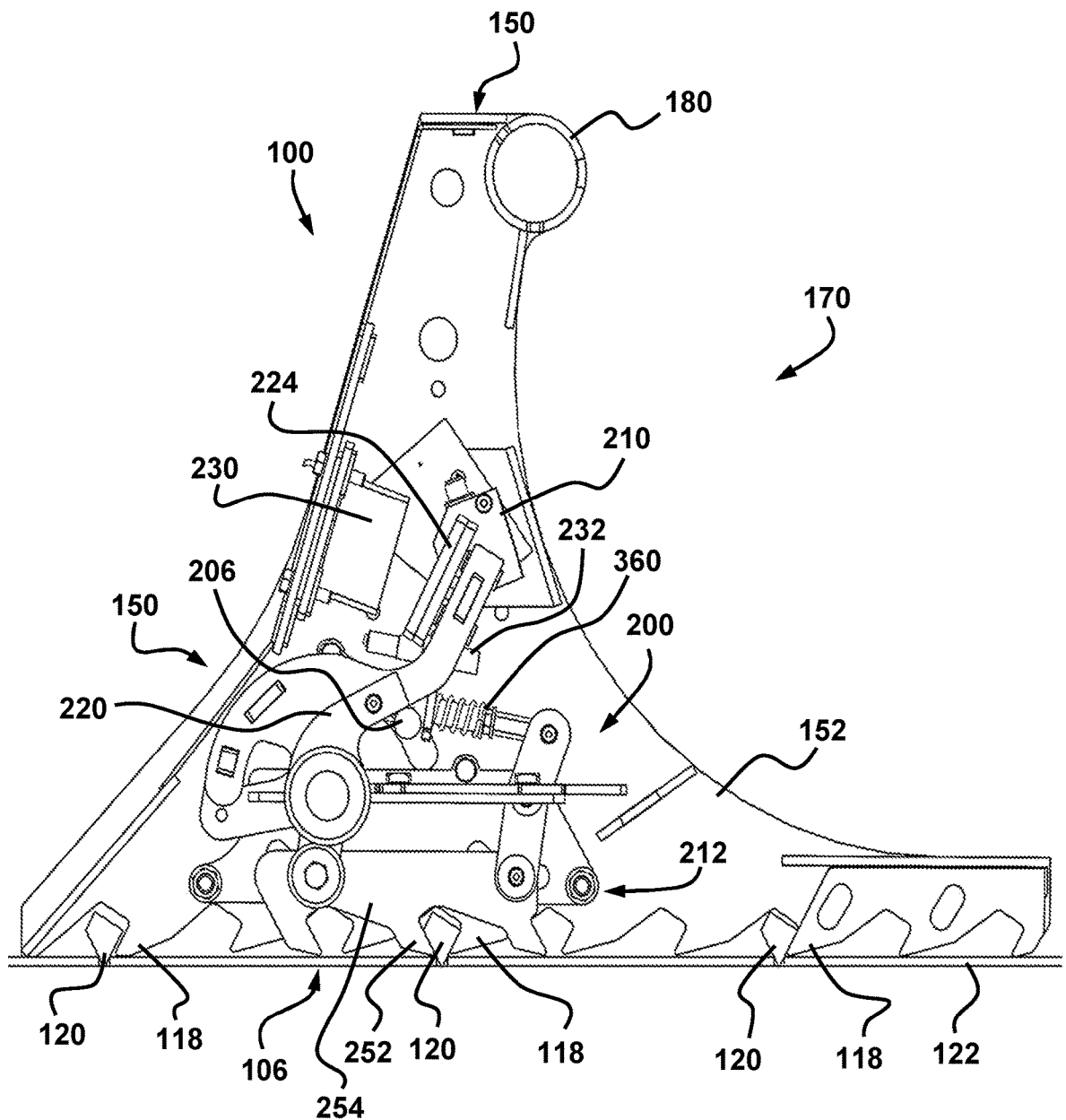
FIG. 16 is a longitudinal cross section view of the wheel chock shown in FIG. 15.

FIG. 16 is a longitudinal cross section view of the wheel chock 100 shown in FIG. 15. As can be seen, the main arm 220 pivoted because it was pushed by the peg 206 on the side of the lever 202. This forced the whole pivoting frame structure 240 to pivot as well, thus the lever arm 290 to be pushed downwards. It then pulled the spring-biased linkage 270 backwards and, as a result, the teeth carrying member 254 moved downwards until one of the teeth 252, in this case the middle one, came into engagement with the corresponding blocking element 120. The ferromagnetic plate 224 is now closer to the electromagnet 230 but it is still out of engagement therewith.

Figure 17:
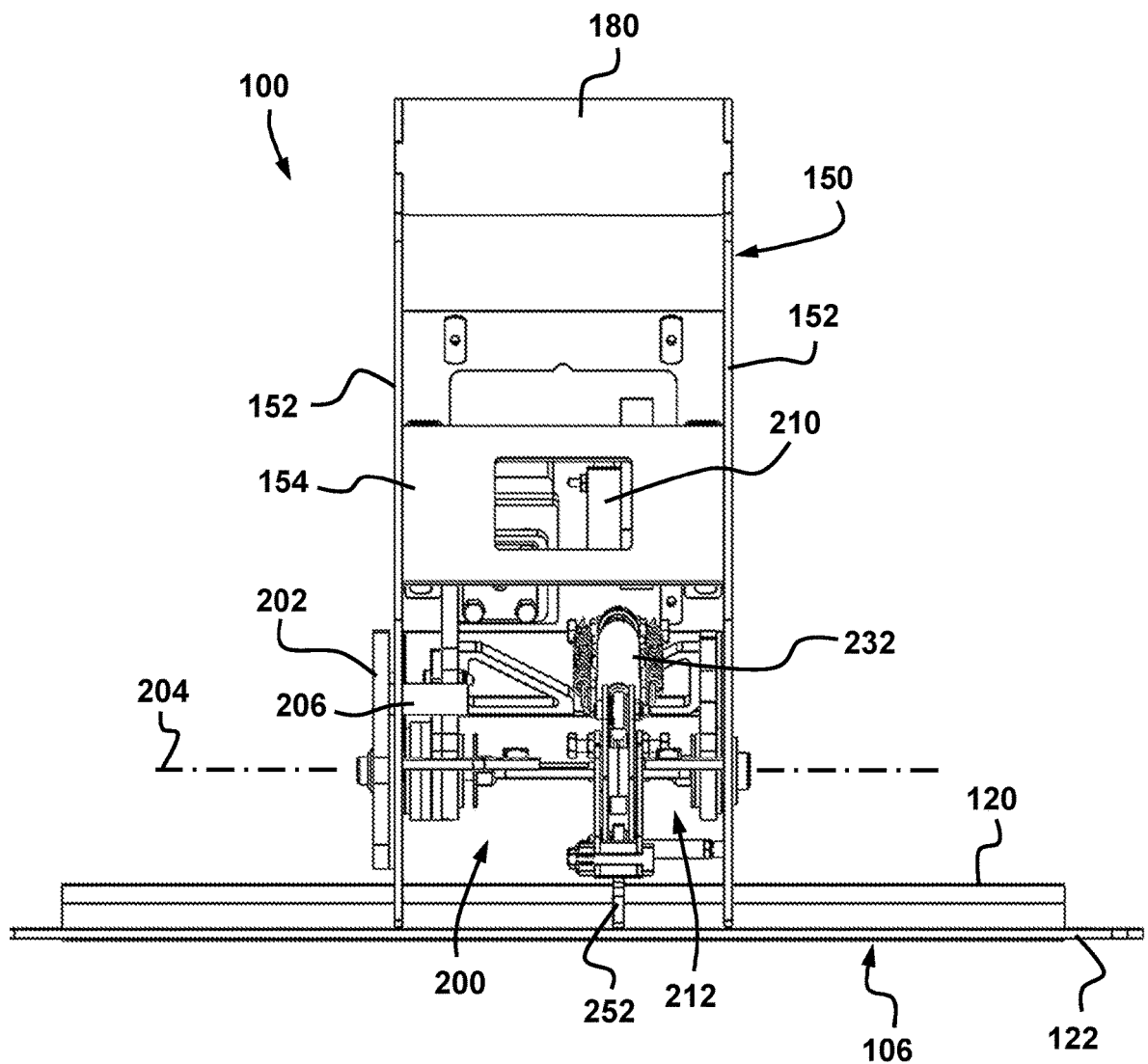
FIG. 17 is a transversal cross section view of the wheel chock taken along line 17-17 in FIG. 15.

FIG. 17 is a transversal cross section view of the wheel chock 100 taken along line 17-17 in FIG. 15.

Figure 18:
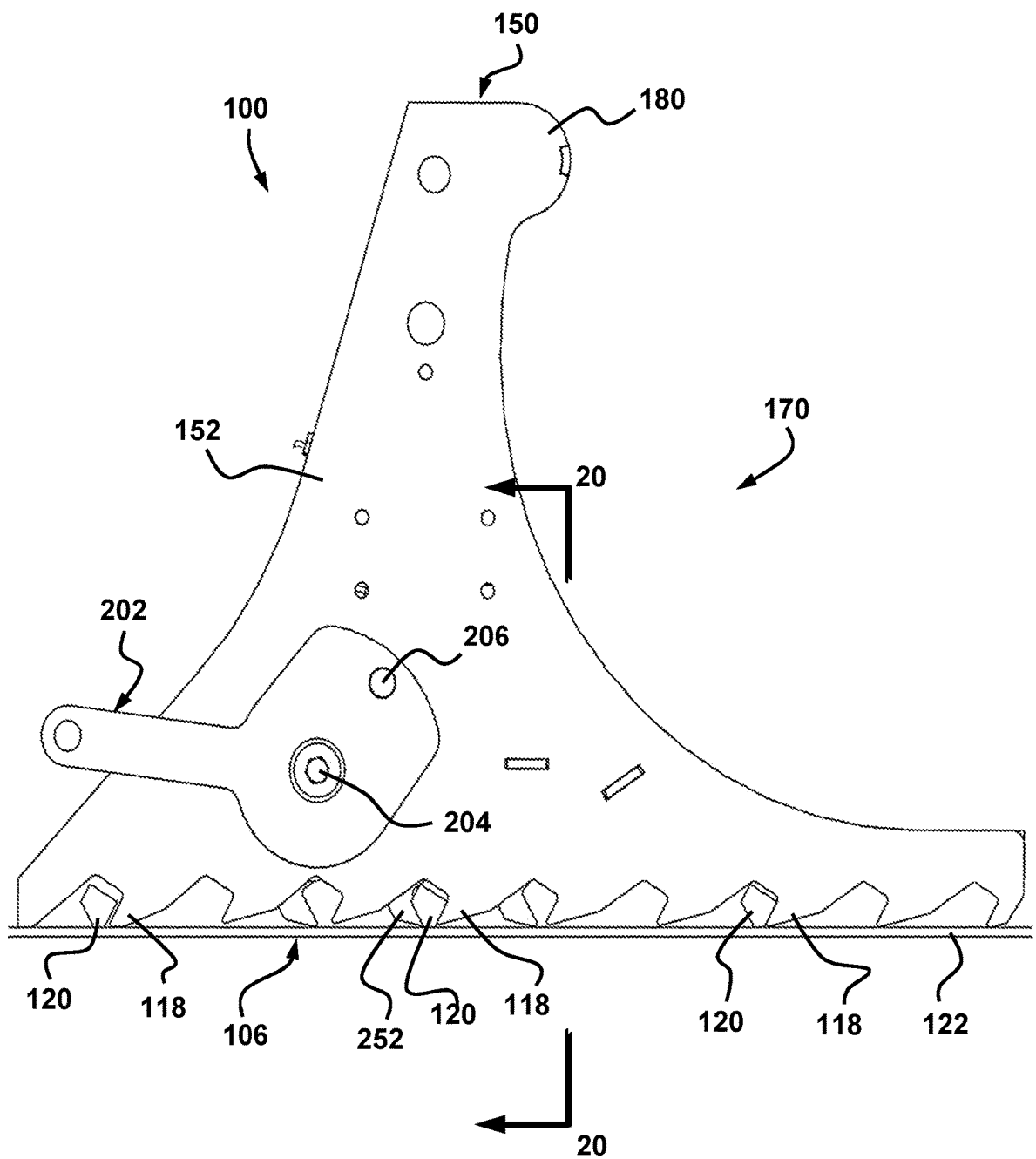
FIG. 18 is a side view illustrating the wheel chock of FIG. 2 when the positioning unit is in the fully locked position.

FIG. 18 is a side view illustrating the wheel chock 100 of FIG. 2 when the positioning unit 212 is in the fully locked position. The lever 202 was pushed all the way down with force, for instance using a foot, until the end position is reached. The teeth carrying member 254 was not further moved significantly since it was already in engagement with one of the blocking elements 120. The spring 360 inside the spring-based linkage 270 was compressed to compensate for the added force.

Figure 19:
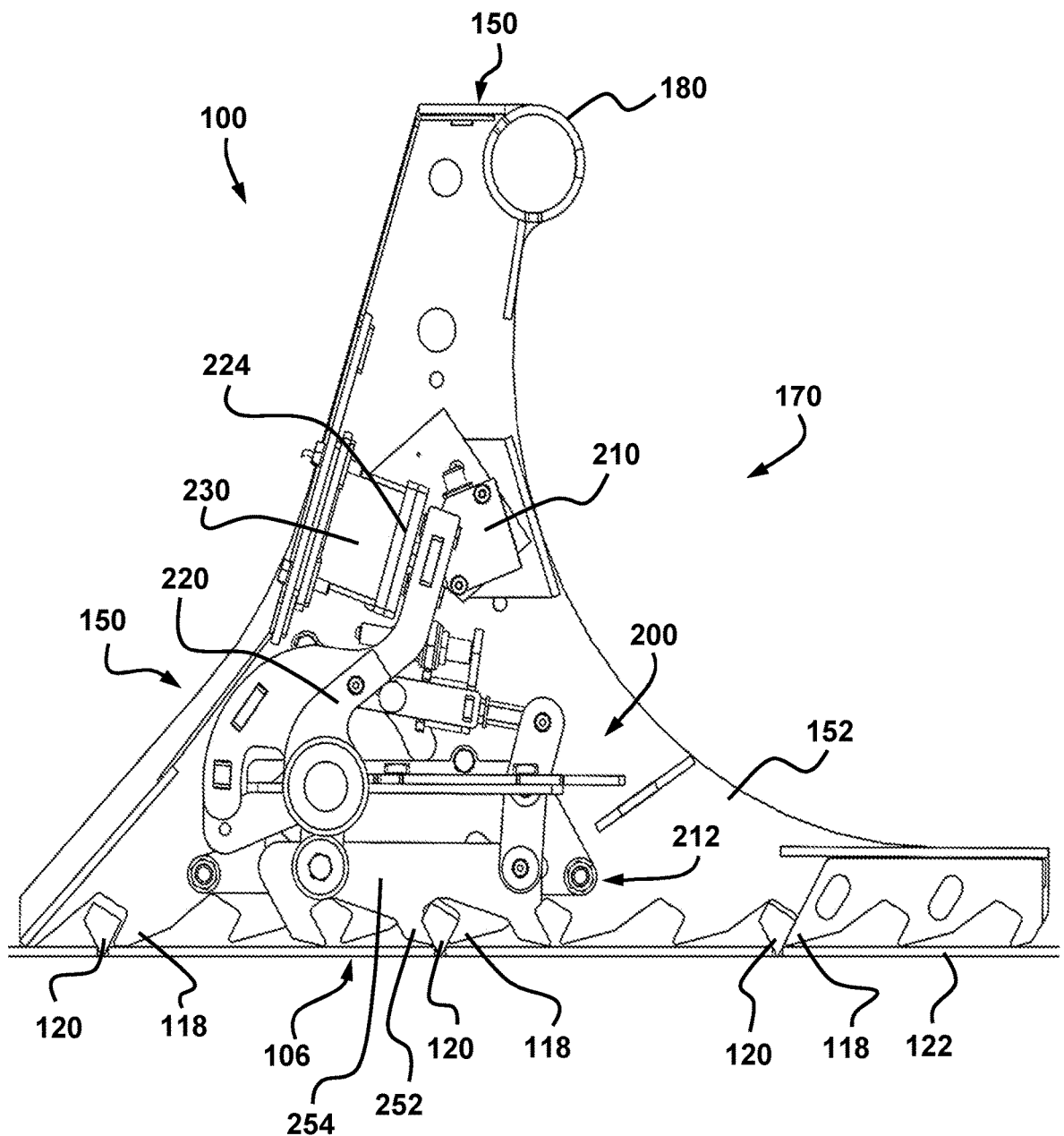
FIG. 19 is a longitudinal cross section view of the wheel chock shown in FIG. 18.

FIG. 19 is a longitudinal cross section view of the wheel chock 100 shown in FIG. 18. As can be seen, the two parts of the position detector 232 are now almost touching one another and the ferromagnetic plate 224 is in engagement with the electromagnet 230. The position detector 232 will indicate that the tooth 252 is properly in position and the electromagnet 230 can then be energized to hold the ferromagnetic plate 224 for as long as required. The position detector 232 will not be in a right position if the tooth 252 does not engage one of the blocking elements 120. For instance, if someone pivots the lever 102 in effort to lock the wheel chock 100 without being on a base plate 106, the lever 202 will pivot the main arm 220 all the way until the ferromagnetic plate 224 abuts against the electromagnet 230 but the two parts 232a, 232b of the position detector 232 will then not be at the right position from one another. Thus, the electromagnet 230 will not be energized. Other configurations and arrangements are possible. For instance, it is possible to keep the electromagnet 230 energized at all time and only interrupt it briefly for releasing the locking mechanism 200.

Unlocking a locked wheel chock 100 can be done in different ways, depending on the requirements. For instance, one can design the wheel chock 100 with a release button 402 (FIG. 23) located somewhere thereon. Other configurations and arrangements are possible as well.

Figure 20:
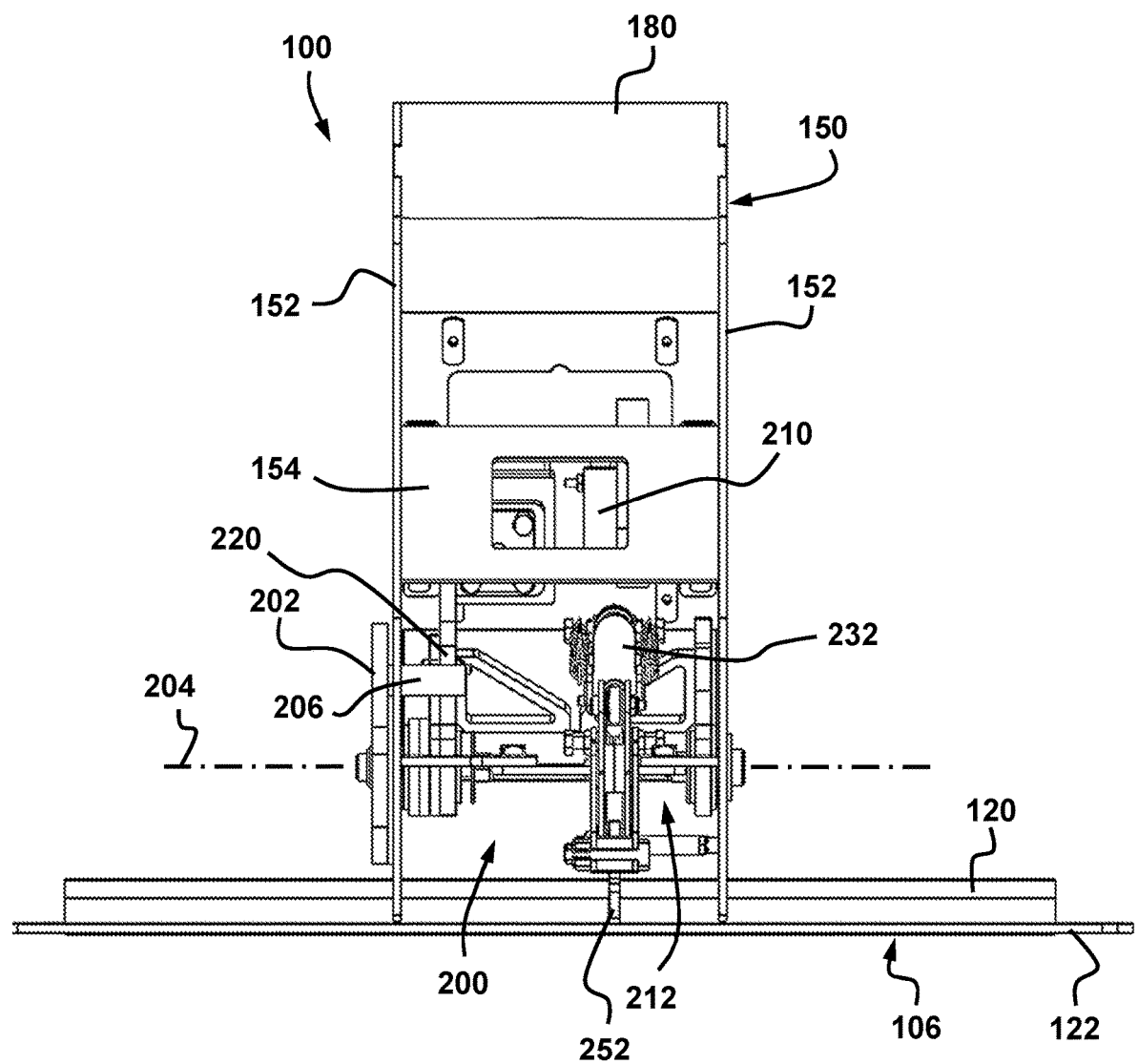
FIG. 20 is a transversal cross section view of the wheel chock taken along line 20-20 in FIG. 18.

FIG. 20 is a transversal cross section view of the wheel chock 100 taken along line 20-20 in FIG. 18.

Figure 21:
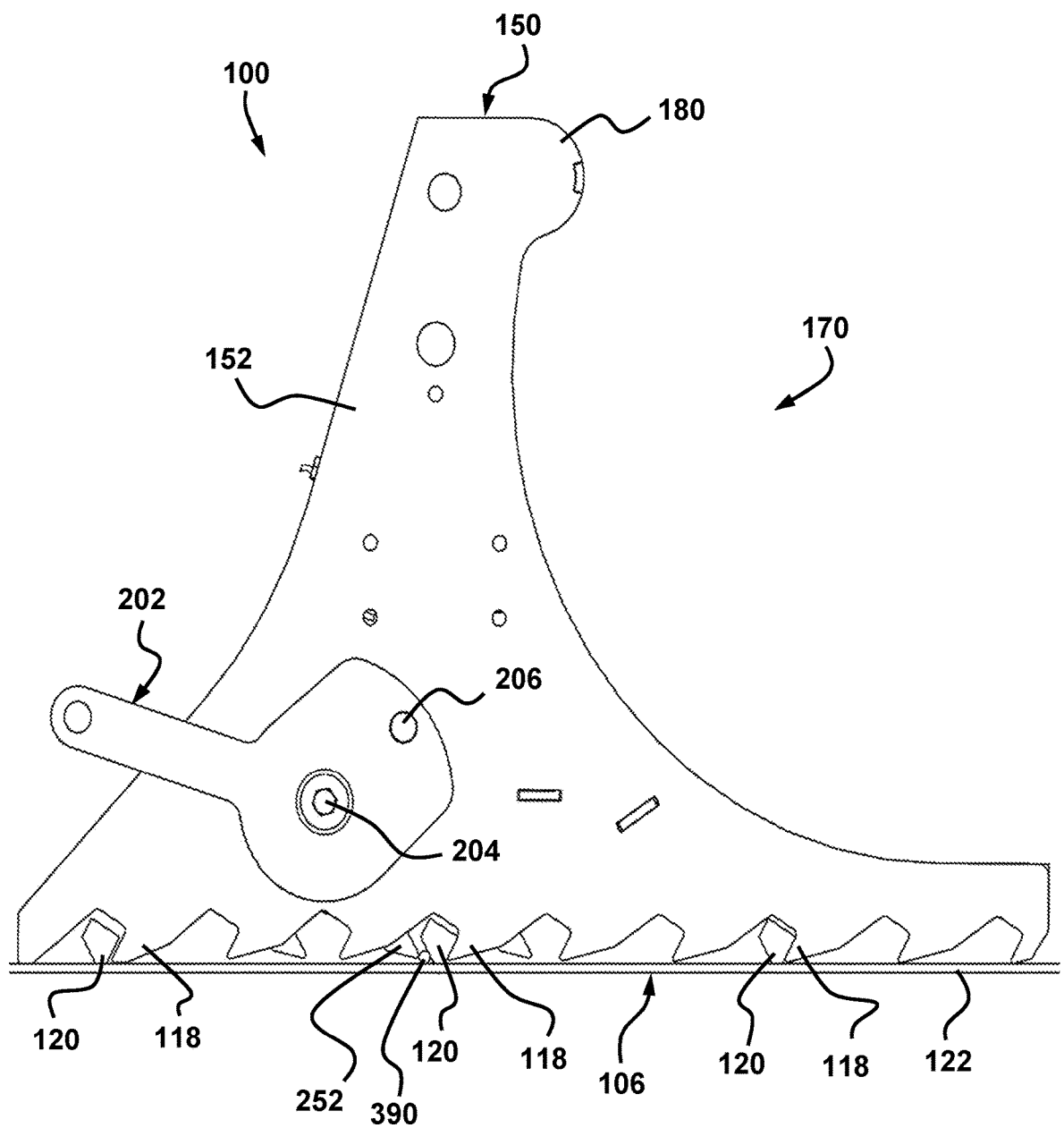
FIG. 21 is a side view illustrating the wheel chock of FIG. 2 when an obstruction prevents one of the teeth on the positioning unit from latching with a corresponding one of the blocking elements.

FIG. 21 is a side view illustrating the wheel chock 100 of FIG. 2 when an obstruction 390 prevents one of the teeth 252 on the positioning unit 212 from latching with a corresponding one of the blocking elements 120. This obstruction 390 is a solid foreign object that was wedged or otherwise trapped underneath the blocking element 120 at the location where the tooth 252 of the locking mechanism 200 will be. An example is a small rock.

Figure 22:
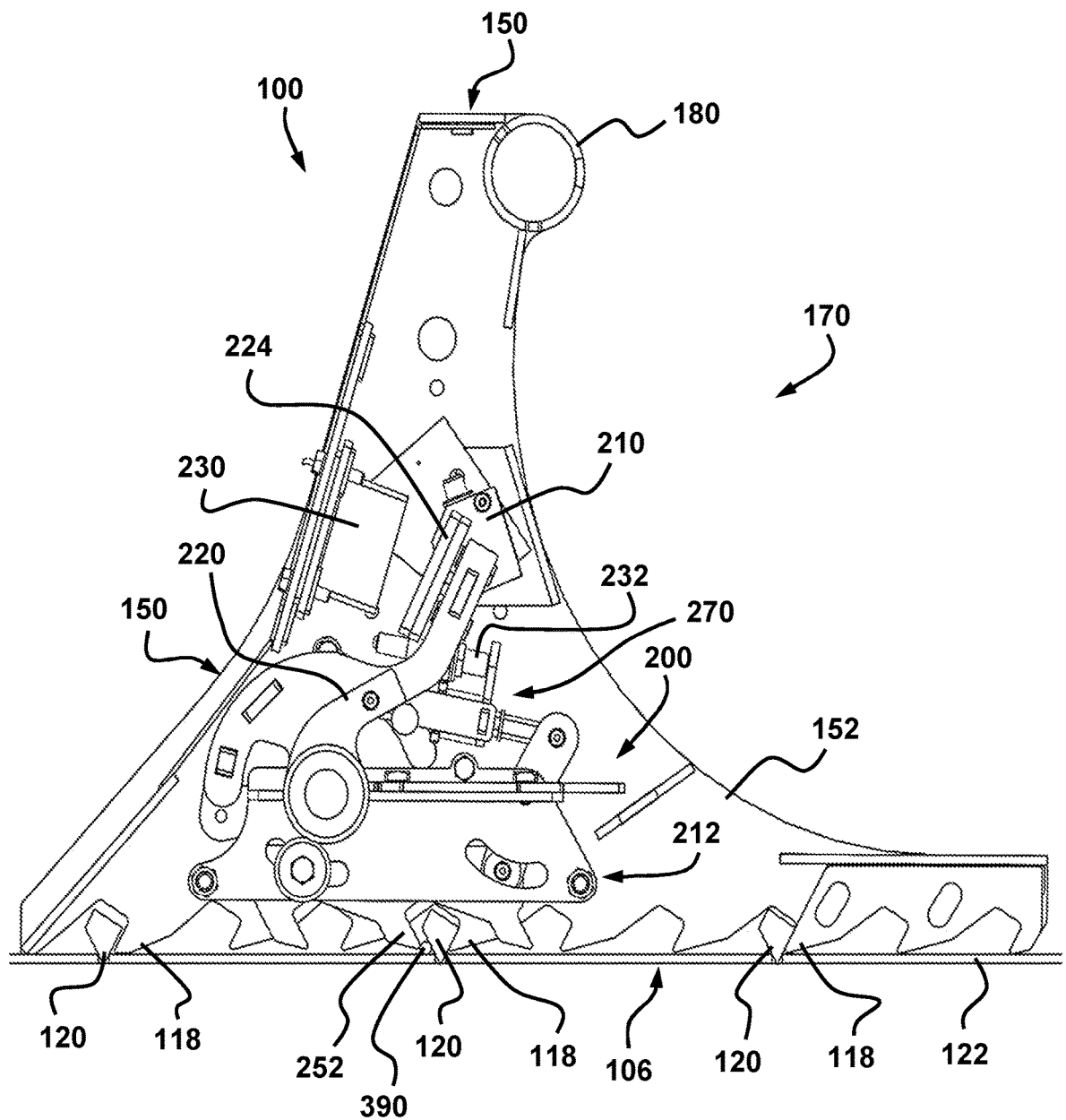
FIG. 22 is a longitudinal cross section view of the wheel chock shown in FIG. 21.

FIG. 22 is a longitudinal cross section view of the wheel chock 100 shown in FIG. 21. As can be seen, the two parts 232a, 232b of the position detector 232 are now against one another. However, the lever 202 is now at its maximum end position but the ferromagnetic plate 224 is still too far from the electromagnet 230 to be attracted by it if energized. Hence, the locking mechanism 200 cannot be held in a locked state. The user must either remove the obstruction 390 or reposition the wheel chock 100 where no obstruction is present. Other configurations and arrangements are possible.

Figure 23:
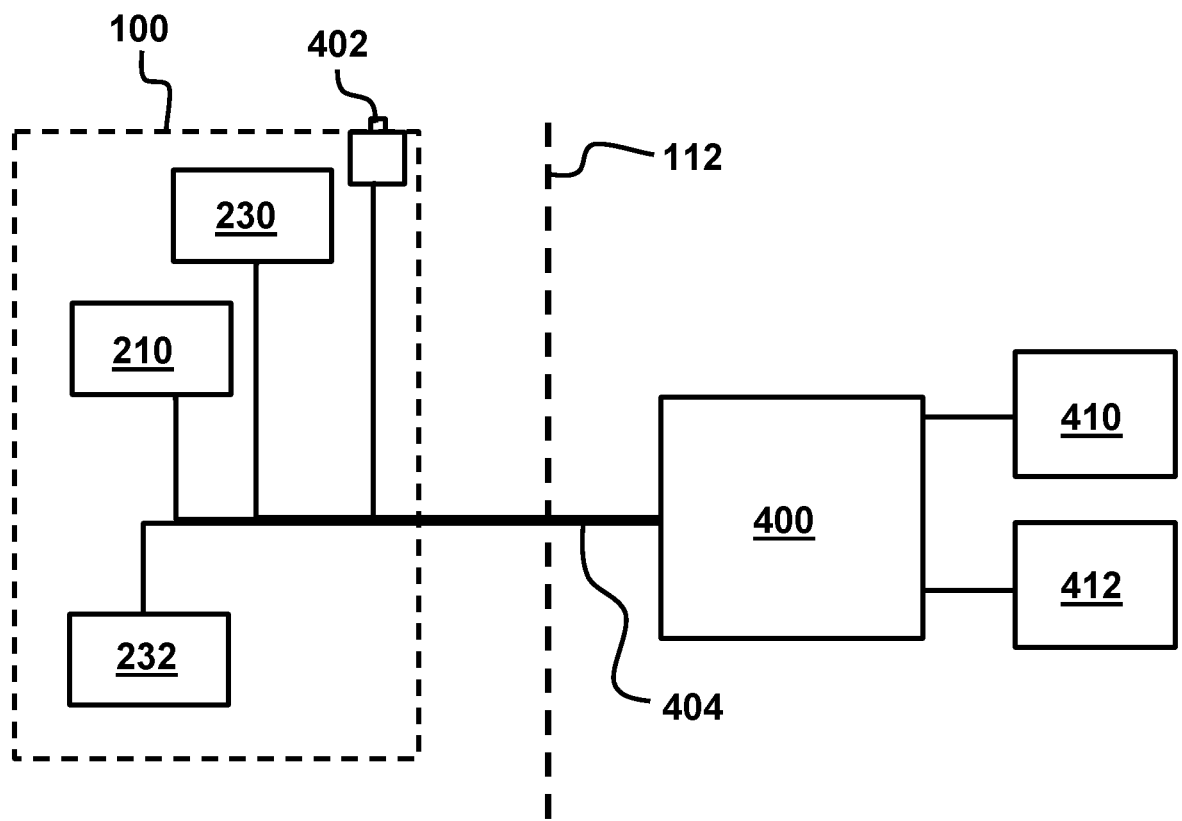
FIG. 23 is a simplified block diagram depicting an example of a control system.

FIG. 23 is a simplified block diagram depicting an example of a control system 400. This control system 400 is connected to the wheel chock 100 via a wire connection 404 that includes, for instance, a wire to supply electrical power and a communication wire for exchanging communication signals with the wheel sensor 210 and the position detector 232, if any. Other configurations and arrangements are possible.

As shown in the example, the control system 400 can include a door control module 410 and also an alarm module 412. The door module 410 can be designed to prevent a garage door at the loading dock 110 from opening unless the control system 400 receives a signal confirming that the corresponding wheel chock 100 has its locking mechanism 200 set in a locked state. The alarm module 412 can be useful to signal a security issue, for instance that the corresponding wheel chock 100 was unlocked unexpectedly while the garage door is still open.

The electrical power required to energize the electromagnet 230 can be supplied through a corresponding wired connection 404. This wire can also be the same used for data communication between the wheel chock 100 and the control system 400. Furthermore, one can use a wireless data communication system, if required, and even have one or more batteries (not shown) inside the wheel chock 100 to power the electromagnet 230 or in case of a power outage. Other configurations and arrangements are possible as well.

Figure 24:
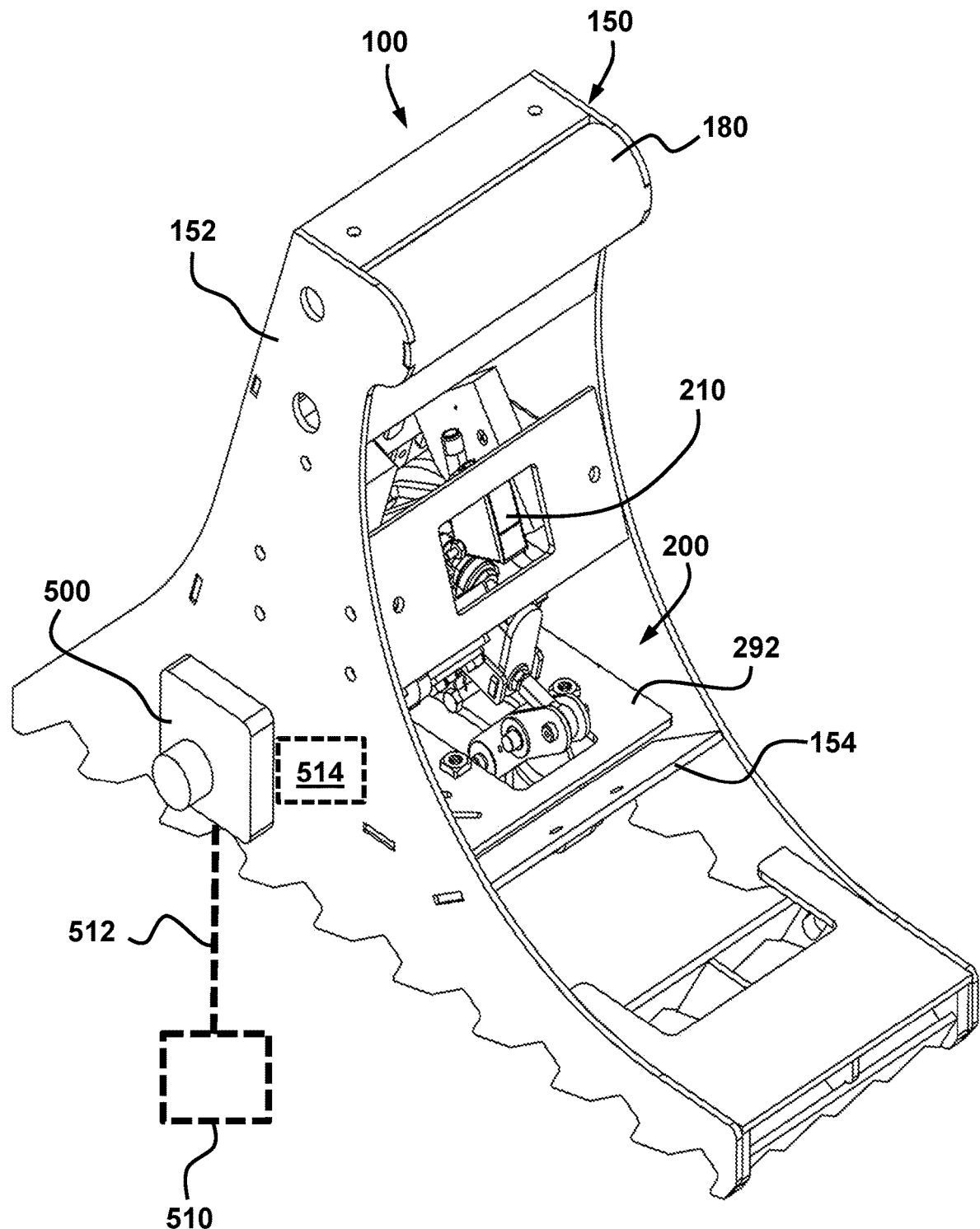
FIG. 24 is an isometric view of an example of a wheel chock in which the positioning unit is moved by a powered actuator.

FIG. 24 is an isometric view of an example of a wheel chock 100 in which the positioning unit 212 is moved by a powered actuator 500. The expression "powered actuator" refers to an actuator that is not human powered. The powered actuator 500 replaces the human-powered lever 202 from the previous figures. Nevertheless, some implementations could include both a lever and a powered actuator. The wheel chock 100 is otherwise similar to the one shown in the previous example.

The powered actuator 500 can be located outside of the wheel chock 100, as shown. However, it is possible to place the powered actuator 500 inside the wheel chock 100 in some implementations, or to have a powered actuator 500 where some parts are outside the main body 150 of the wheel chock 100 and some parts are inside thereof. The powered actuator 500 can be, for instance, hydraulic, pneumatic or electric. The powered actuator 500 can be a rotary actuator, for instance an electric motor or a revolving piston, or be a linear actuator configured and disposed to generate a motion of an element similar to the peg 206 in the previous example. The powered actuator 500 provides the force to urge the positioning unit 212 towards the fully locked position. Variants are possible. For instance, the powered actuator 500 could apply a linear force directly on one of the components of the positioning unit 212 instead of transmitting the motive power through an intermediary element. Other variants are possible as well.

In the illustrated example, the source of power 510 is located outside of the main body 150 of the wheel chock 100 and is sent to the powered actuator 500 through cables or hoses 512. This can also be done using the wired connection 404 in FIG. 23. Variants are possible. For instance, the source of power could be an internal power source 514 located on or in the wheel chock 100 itself. One example is an electric motor powered by one or more batteries on the wheel chock 100. Using both an external power source 510 and an internal power source 514 on the same wheel chock 100 is also possible. Other variants can be devised as well.

Figure 25:
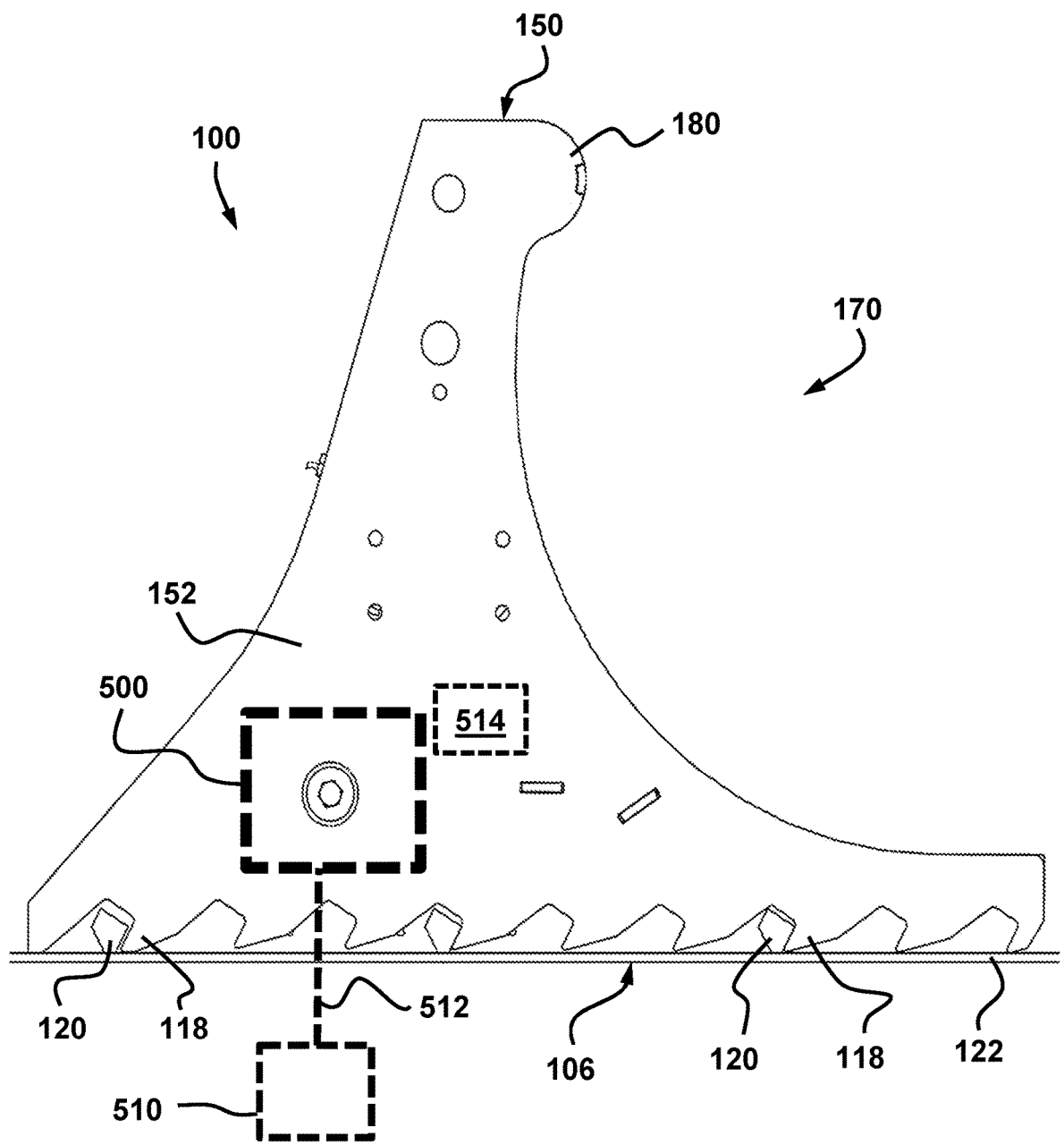
FIG. 25 is a semi-schematic side view of a variant of the wheel chock shown in FIG. 24.

FIG. 25 is a semi-schematic side view of a variant of the wheel chock 100 shown in FIG. 24. The powered actuator 500 is located inside the main body 150 of the wheel chock 100, as schematically shown.

Figure 26:
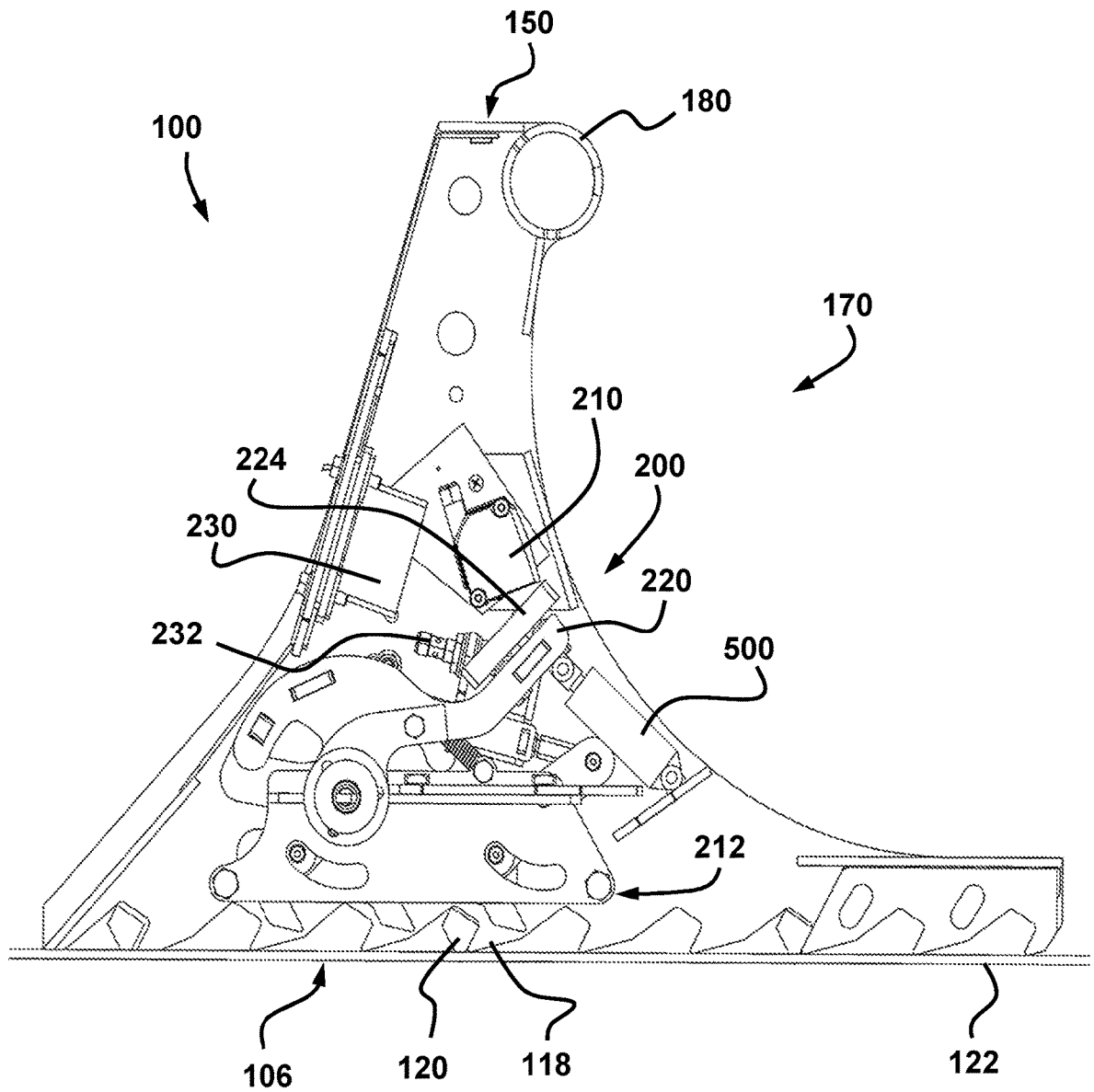
FIG. 26 is a longitudinal cross section view of an example of the wheel chock where the powered actuator in FIG. 25 is implemented as a linear actuator.
Figure 27:
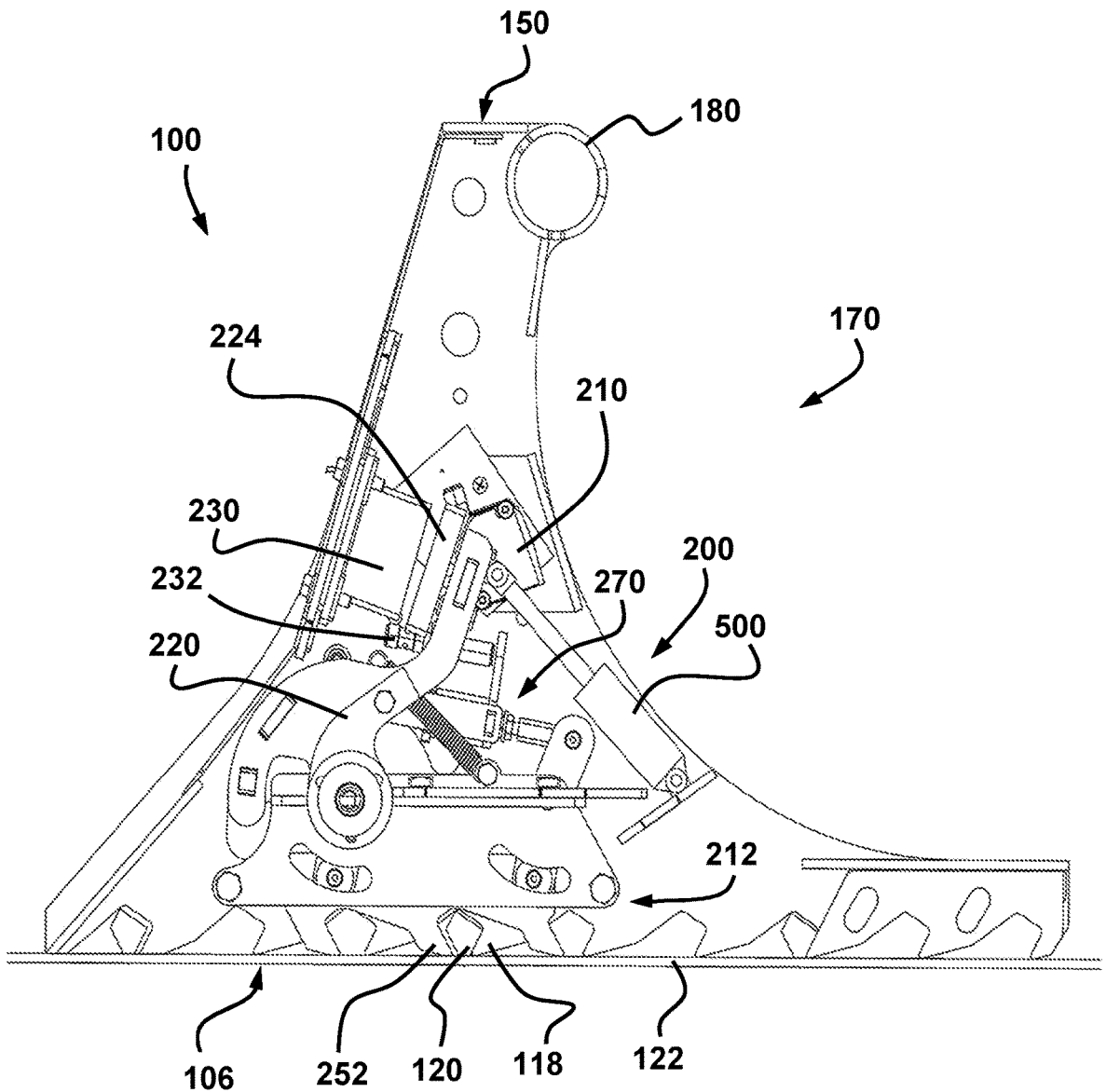
FIG. 27 is a view similar to FIG. 26, showing the parts when the positioning unit is almost in the fully locked position.

FIG. 26 is a longitudinal cross section view of an example of the wheel chock 100 where the powered actuator 500 in FIG. 25 is implemented as a linear actuator having one end operatively connected to the positioning unit 212. The positioning unit 212 is illustrated in the unlocked position in FIG. 26. FIG. 27 is a view similar to FIG. 26, showing the parts when the positioning unit 212 is almost in the fully locked position, namely at a position where the ferromagnetic plate 224 is close enough to be grabbed by the electromagnet 230. Variants are possible.

Figure 28:
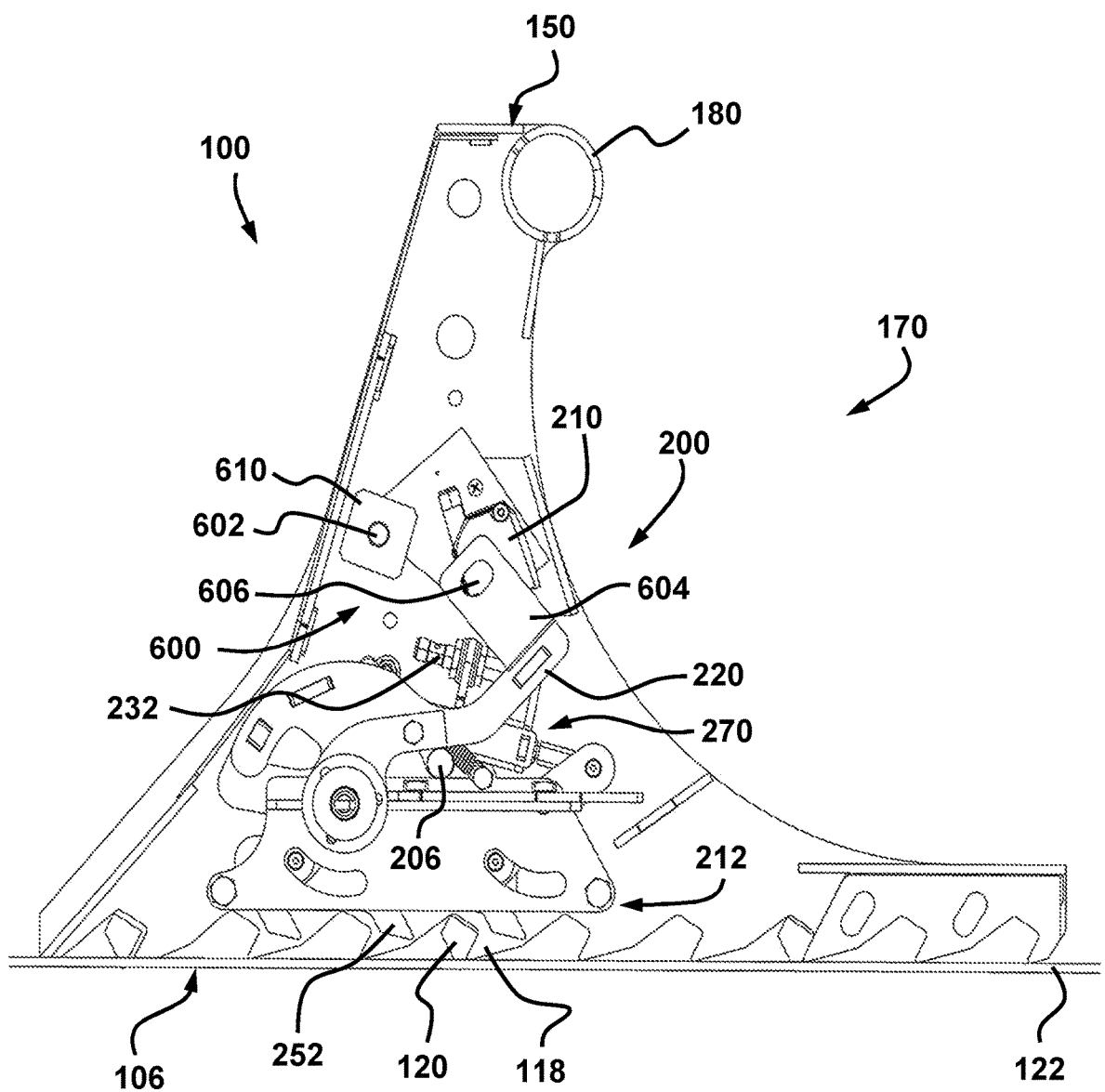
FIG. 28 is a longitudinal cross section view of an example of the wheel chock in which the locking mechanism includes a locking pin system.
Figure 29:
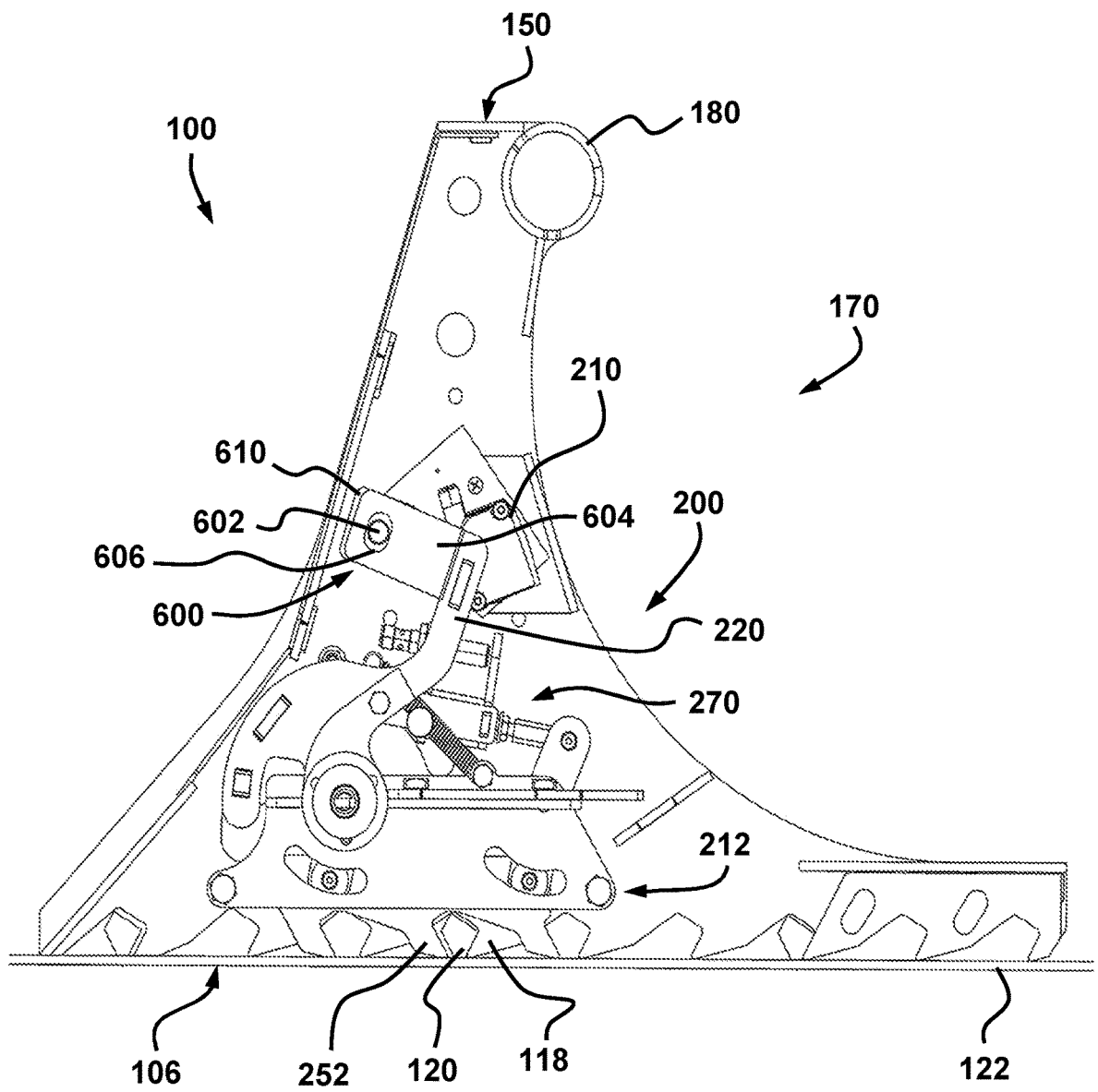
FIG. 29 is a view similar to FIG. 28, showing the parts when the positioning unit is in the fully locked position.

FIG. 28 is a longitudinal cross section view of an example of the wheel chock 100 in which the locking mechanism 200 includes a locking pin system 600 to lock the parts in the fully locked position. The positioning unit 212 is illustrated in the unlocked position in FIG. 28. FIG. 29 is a view similar to FIG. 28, showing the parts when the positioning unit 212 is in the fully locked position. The locking pin system 600 can include a side pin 602 cooperating with a catch member 604 that is rigidly attached at or near the end of the main arm 220. The catch member 604 includes a lateral hole 606 that registers with the trajectory of the side pin 602 in the fully locked position. This allows the side pin 602 to enter the lateral hole 606, thereby holding the positioning unit 212 in the fully locked position. The side pin 602 can be actuated by a powered actuator 610, for instance a solenoid or another kind of linear actuators. Other kinds of powered actuators and other variants are possible as well.

Figure 30:
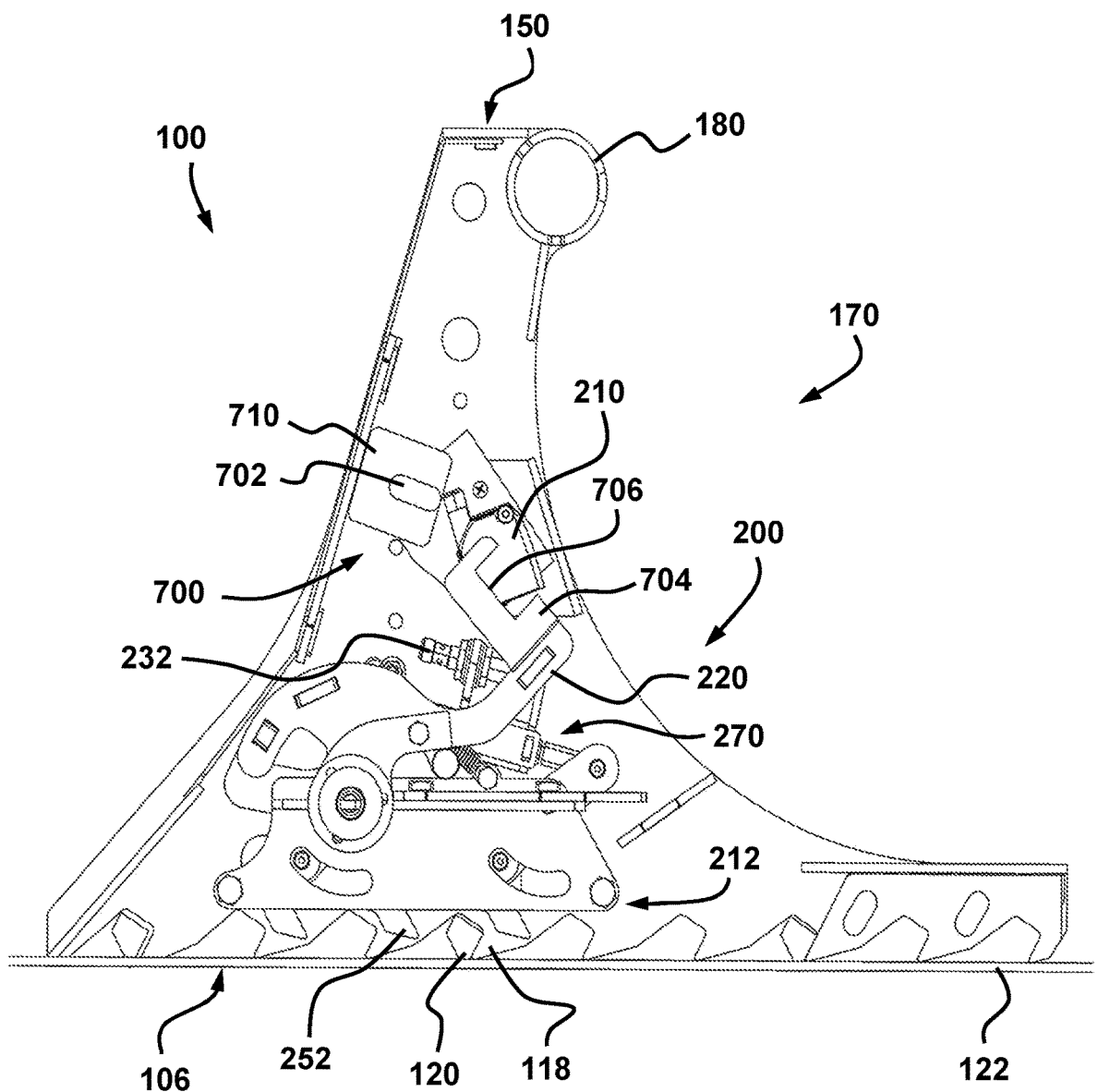
FIG. 30 is a longitudinal cross section view of an example of the wheel chock in which the locking mechanism includes a pivoting latch system.
Figure 31:
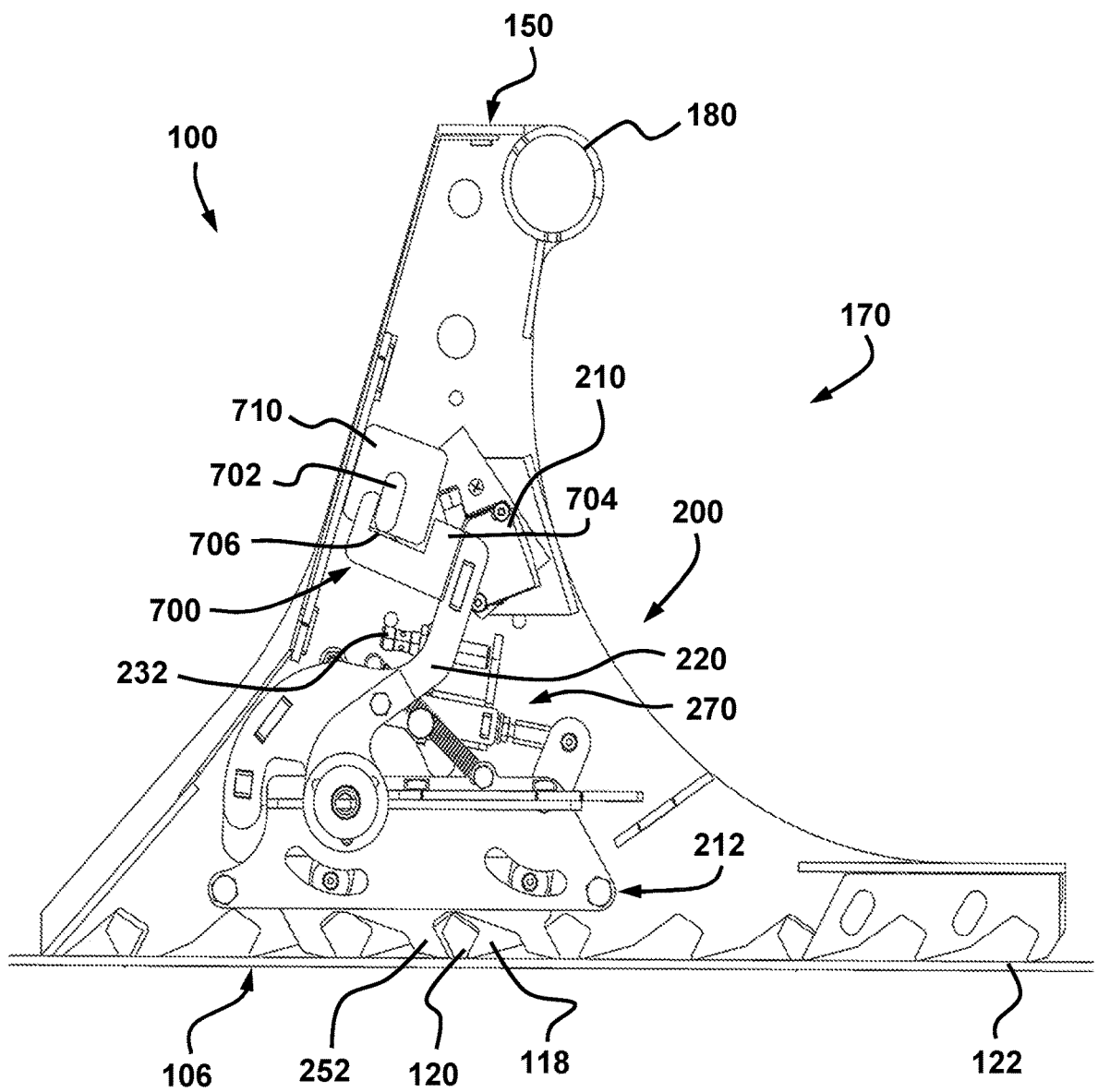
FIG. 31 is a view similar to FIG. 30, showing the parts when the positioning unit is in the fully locked position.

FIG. 30 is a longitudinal cross section view of an example of the wheel chock 100 in which the locking mechanism 200 includes a pivoting latch system 700 to lock the parts in the fully locked position. The positioning unit 212 is illustrated in the unlocked position in FIG. 30. FIG. 31 is a view similar to FIG. 30, showing the parts when the positioning unit 212 is in the fully locked position. The pivoting latch system 700 can include a pivoting latch member 702 cooperating with a catch member 704 that is rigidly attached at or near the end of the main arm 220. The catch member 704 includes a top opening 706 having a rectangular profile. The top front part of the catch member 704 can pass right under the bottom flat side of the latch member 702 when it is in the unlocked position, as shown in FIG. 30. However, once the catch member 704 reaches the fully locked position, or is almost at the fully locked position, the latch member 702 pivots of about 90 degrees to hold the parts since it cannot be moved out of the opening 706, thereby preventing the wheel chock 100 from being removed from the base plate 106. The latch member 702 can be actuated by a powered actuator 710, for instance an electric motor or another kind of rotary actuators. Other kinds of powered actuators and other variants are possible as well.

Figure 32:
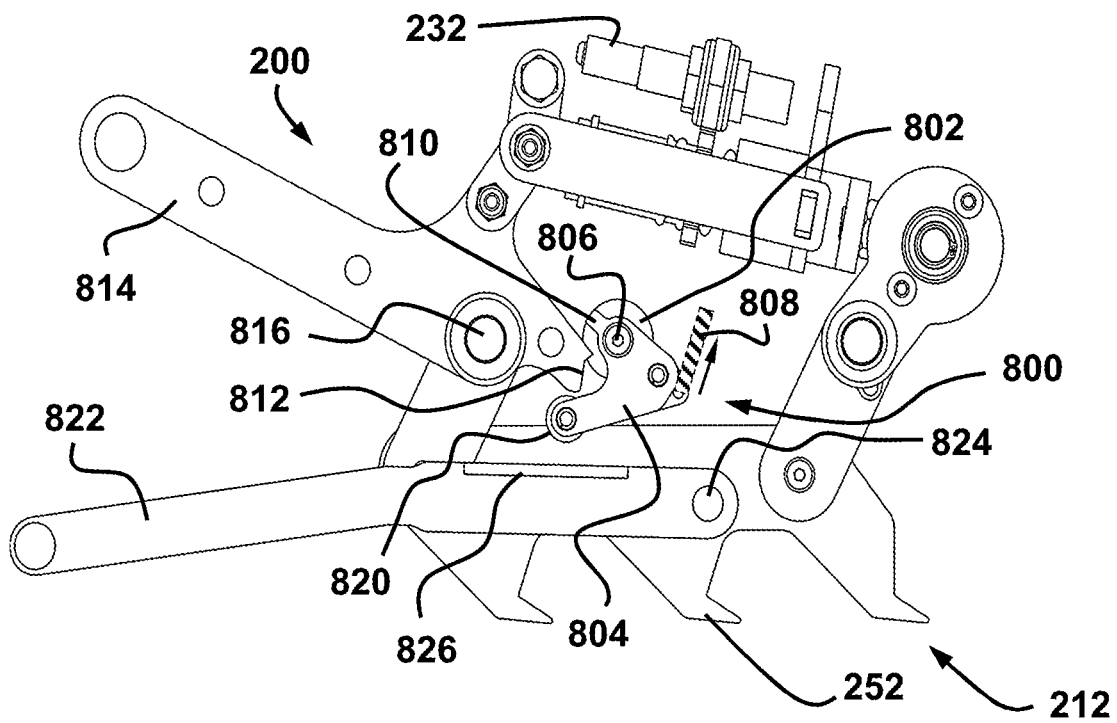
FIG. 32 is an enlarged view showing some of the parts of an example of a locking mechanism that can be held in a locked state using a latching system that is not mounted on the main arm.
Figure 33:
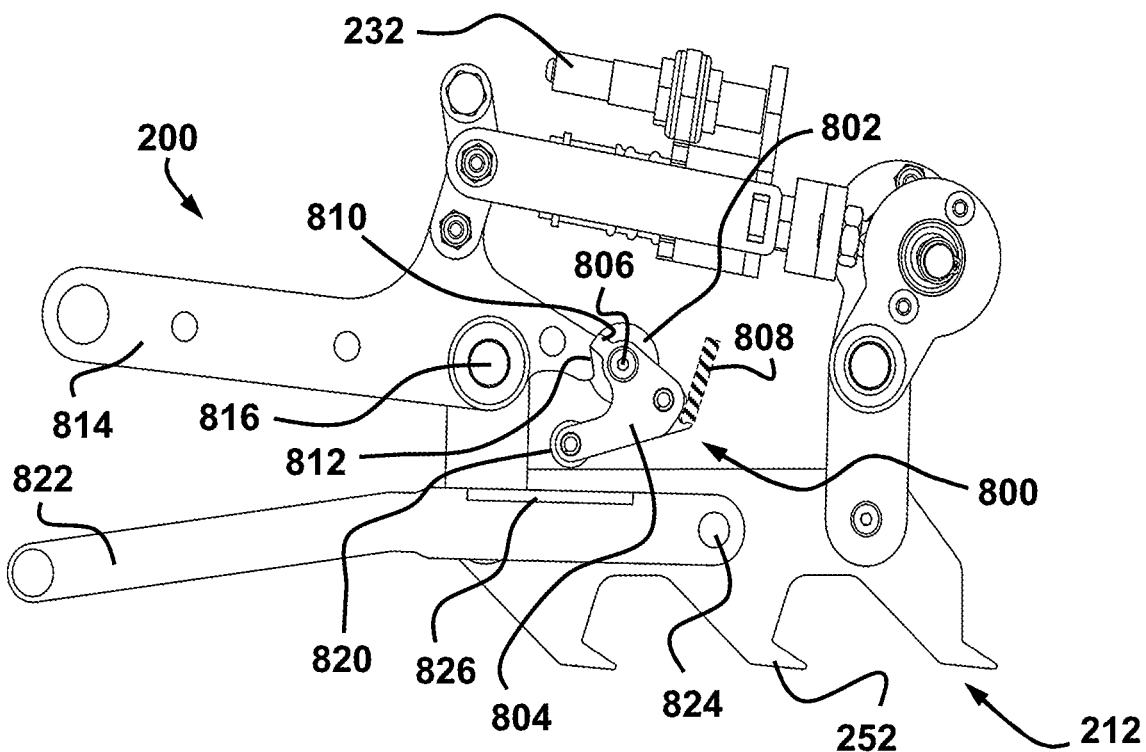
FIG. 33 is a view similar to FIG. 32, showing the parts when the positioning unit is in the fully locked position.

FIG. 32 is an enlarged view showing some of the parts of an example of a locking mechanism 200 can be held in a locked state using a latching system 800 that is not mounted on the main arm 220. The positioning unit 212 is illustrated in the unlocked position in FIG. 32. FIG. 33 is a view similar to FIG. 32, showing the parts when the positioning unit 212 is in the fully locked position. The latching system 800 includes a holder 802 that is in a torque-transmitting engagement with a pivoting bracket 804. The holder 802 and the bracket 804 pivot around a transversal axis 806 located at the center of the holder 802 in the example. A return spring 808 biases the holder 802 and the bracket 804 in a counterclockwise direction in the views. The arrow next to the return spring 808 in FIG. 32 illustrates the return force. The return spring 808 is only schematically depicted and could be replaced by an equivalent structure, or even be omitted in some implementations. In the example, the bottom end of the return spring 808 is attached to a hole in the bracket 804 and the upper end is attached to another part, for instance a fixed part of the wheel chock 100 or one of the other mobile parts of the locking mechanism 200. Other variants are possible.

In the example shown in FIGS. 32 and 33, the holder 802 includes a single radially-extending tooth 810 that is configured and disposed to cooperate with a notched end 812 of a lever arm 814. The lever arm 814 pivots around a pivot axis 816 and the notched end 812 is provided on the short side of the lever arm 814. As can be seen in FIG. 33, the parts are configured and disposed so that the notched end 812 latches with the tip of the tooth 810 and holds this position when the lever arm 814 is pivoted to an angle corresponding to the fully-locked position. The bracket 804 also includes a release roller 820 at the free end of an arm of the bracket 804. The release roller 820 cooperates with a release lever 822 located underneath. The release lever 822 pivots around a pivot axis 824 to bring a recessed surface 826 in engagement with the release roller 820 so as to change the position unit 212 from the fully locked position to the unlock position. The release lever 822 can be pivoted manually, for instance using a hand or a foot of a user. The release lever 822 could also be operated by a powered actuator. Variants are possible and other kinds of release mechanisms are possible as well.

It should be noted that other kinds of locking arrangements and configurations are possible. Hence, the proposed concept is not limited to the examples shown herein.

Figure 34:
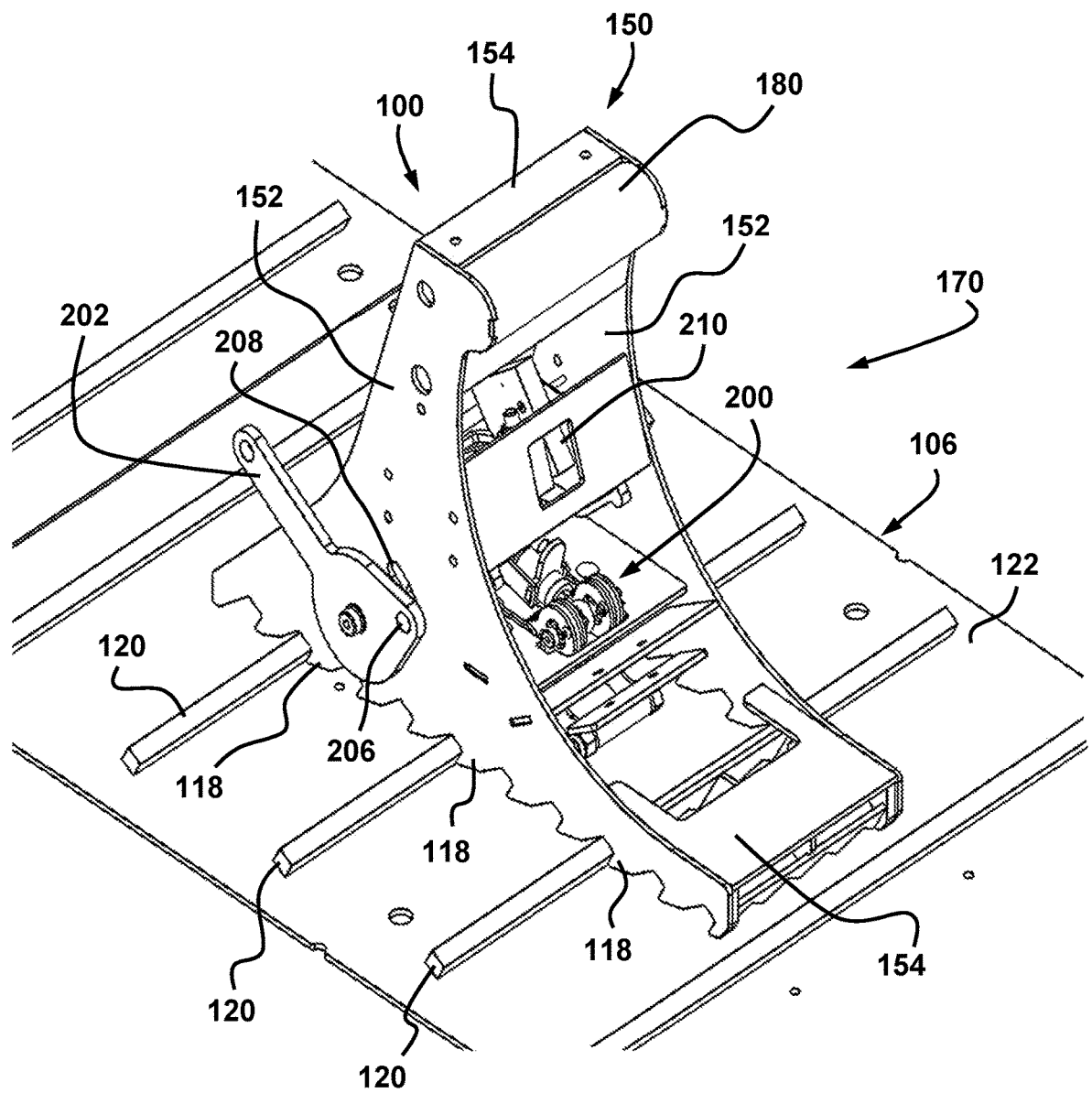
FIG. 34 is an isometric view illustrating an example of a wheel chock in which the positioning unit includes two rows of teeth disposed in parallel.

FIG. 34 is an isometric view illustrating an example of a wheel chock 100 in which the positioning unit 212 includes two rows of teeth 252 disposed in parallel. This variant is referred hereafter as the double-row locking mechanism 200. Many components are otherwise similar to the locking mechanism 200 having a single row of teeth. One of the interesting features of the double-row locking mechanism 200 is that it can properly lock the wheel chock 100 to the base plate 106 if a small obstruction is only present between the corresponding tooth 252 of one side and the corresponding blocking element 120. A tie rod assembly 380 is provided to compensate for small variations in the positions between the two sides. The tie rod assembly 380 includes a plurality of ball joints 382 or the like, as shown. Other configurations and arrangements are possible.

Figure 35:
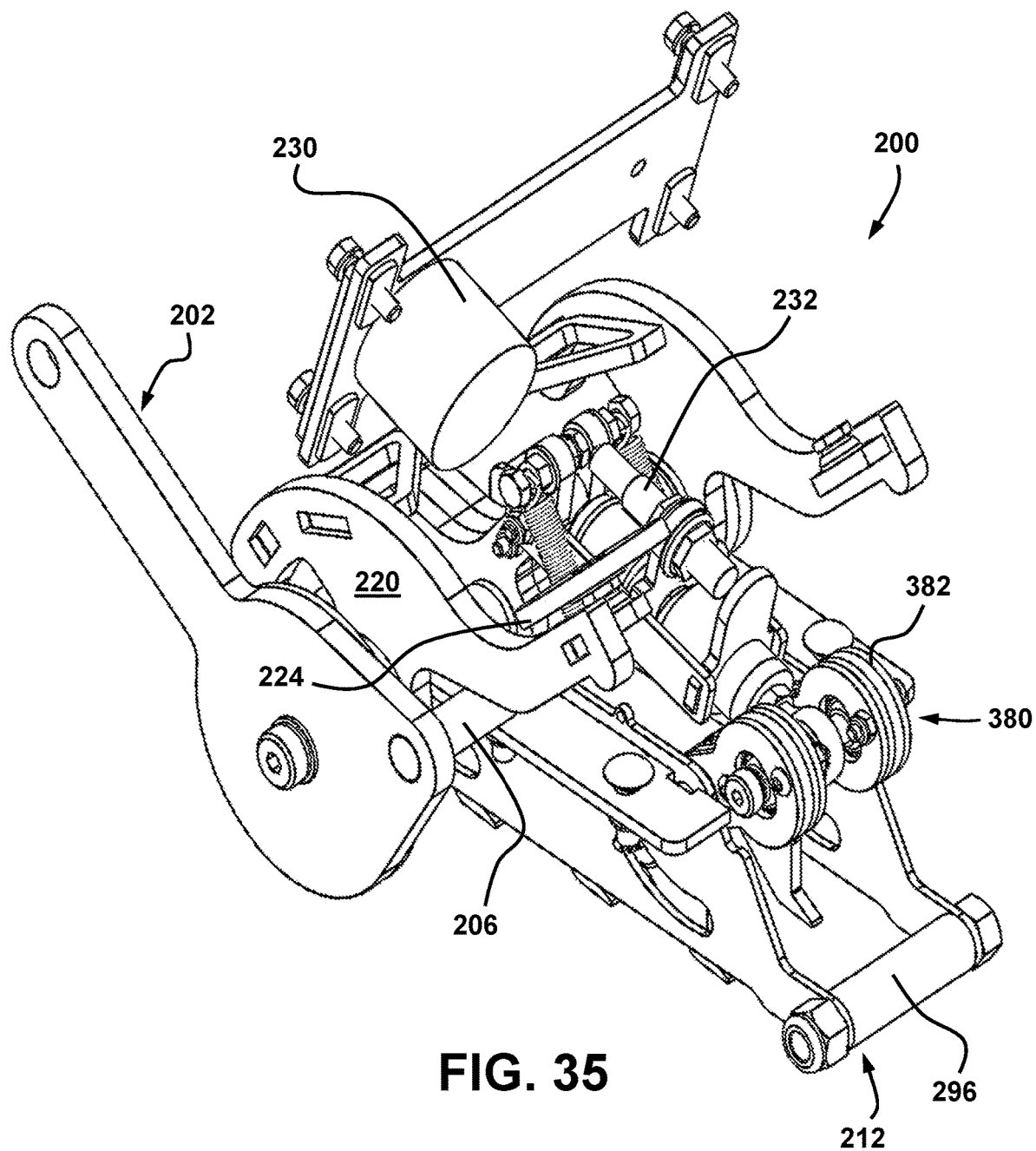
FIG. 35 is an enlarged isometric view of the locking mechanism inside the wheel chock of FIG. 34.

FIG. 35 is an enlarged isometric view of the double-row locking mechanism 200 inside the wheel chock 100 of FIG. 34.

Figure 36:
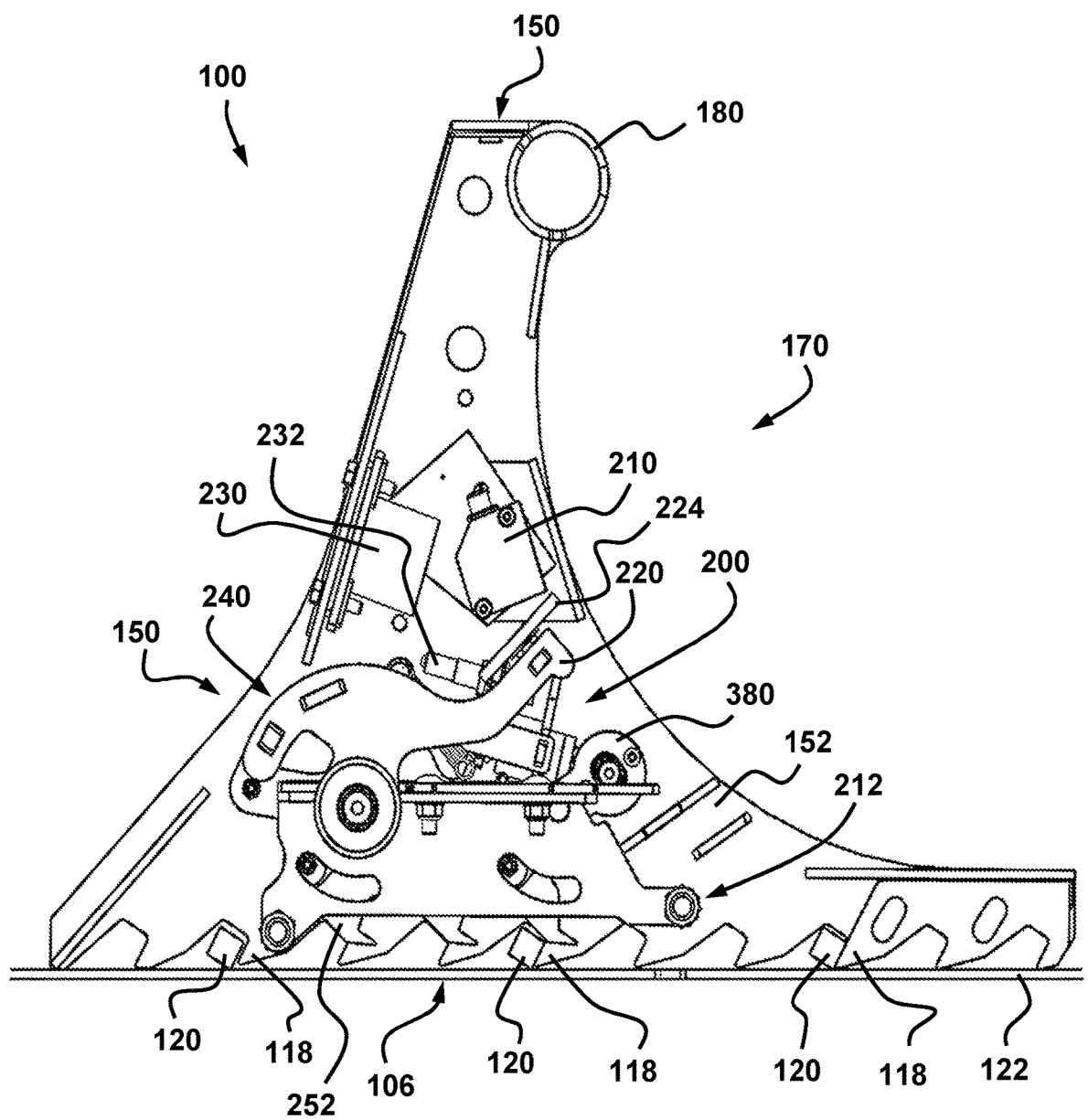
FIG. 36 is a longitudinal cross section view of the wheel chock shown in FIG. 34.

FIG. 36 is a longitudinal cross section view of the wheel chock 100 shown in FIG. 34.

Figure 37:
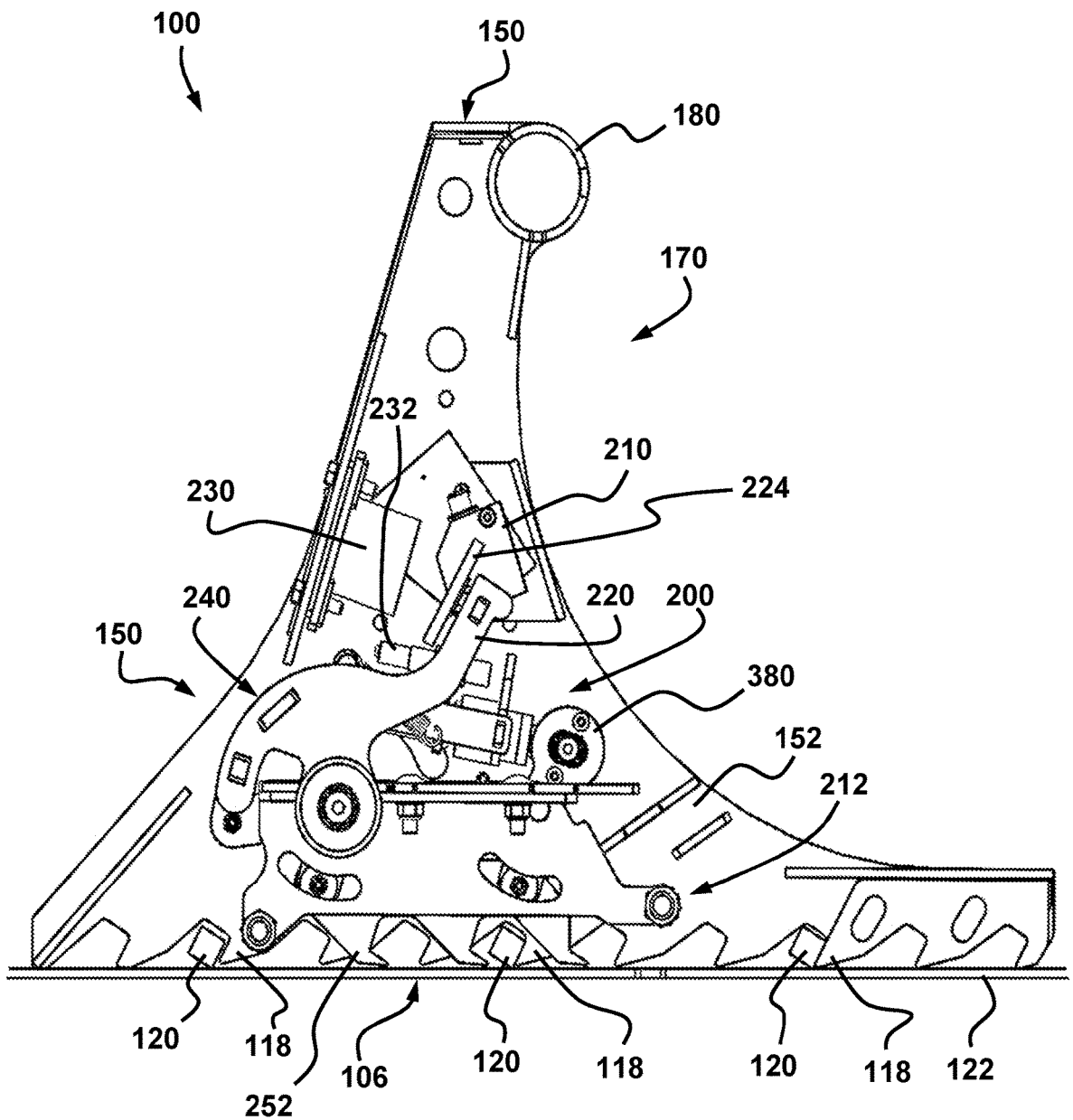
FIG. 37 is a view similar to FIG. 36 but showing the parts when the positioning unit is about halfway between the unlocked position and the fully locked position.

FIG. 37 is a view similar to FIG. 36 showing the parts when the positioning unit 212 is about halfway between the unlocked position and the fully locked position.

Figure 38:
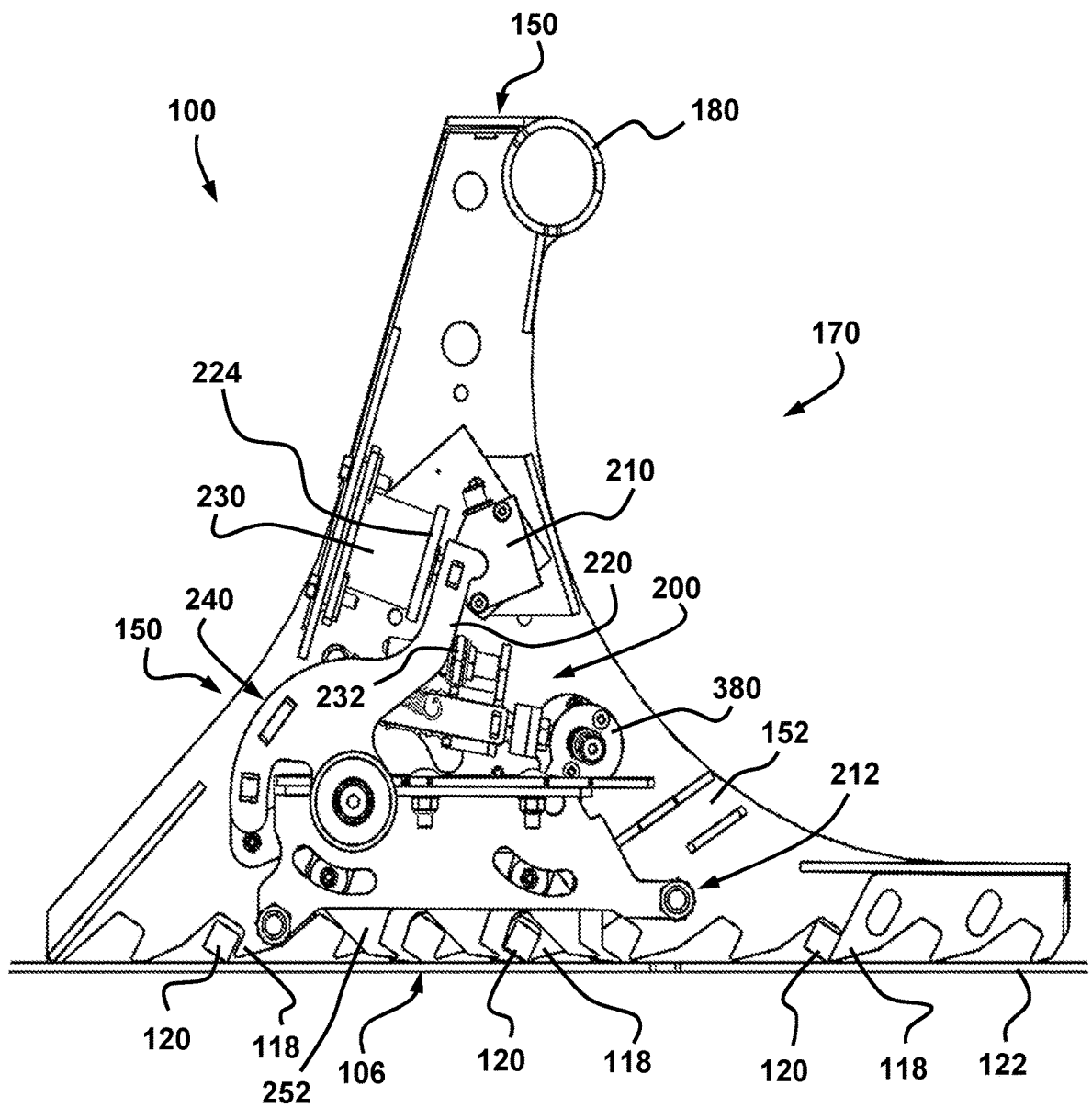
FIG. 38 is a view similar to FIG. 36 but showing the parts when the positioning unit is in the fully locked position.

FIG. 38 is a view similar to FIG. 36 but showing the parts when the positioning unit 212 is in the fully locked position. This figure depicts an example of a situation where the two sides are asymmetric because one of the rows encountered an obstruction but the wheel chock 100 was still able to be set in the fully locked position.

Figure 39:
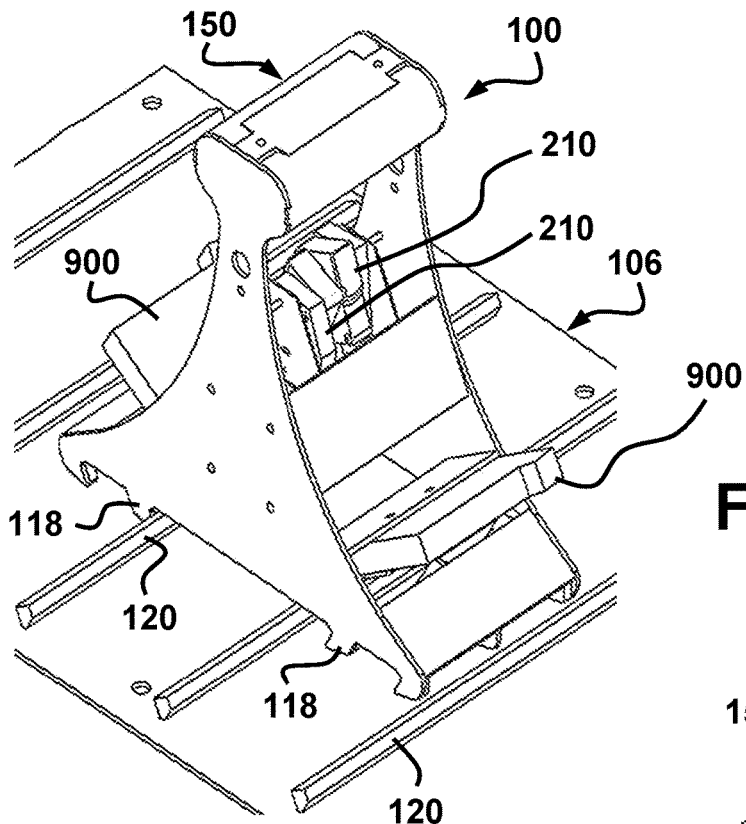
FIG. 39 is an isometric view of an example of a double-sided wheel chock.
Figure 40:
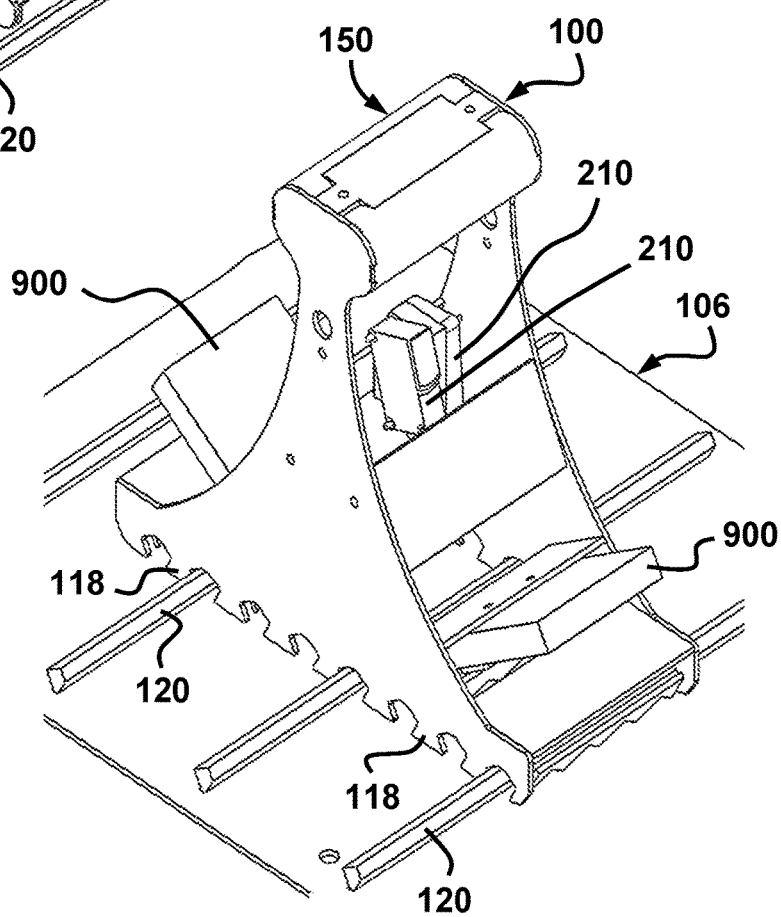
FIG. 40 is a view similar to FIG. 39, showing another example of a double-sided wheel chock.

FIG. 39 is an isometric view of an example of a double-sided wheel chock 100. This wheel chock 100 can be used in a bidirectional wheel chock restraint system. FIG. 40 is a view similar to FIG. 39, showing another example of a double-sided wheel chock 100. The wheel chocks 100 in FIGS. 39 and 40 have a different configuration of teeth 118. They are otherwise relatively similar. Further details on double-sided wheel chocks can be found, among other things, in PCT patent application publication No. 2016/191882 A1 published 8 Dec. 2016. The proposed concept can be implemented in double-sided wheel chocks as well. For instance, it is possible to have a single locking mechanism, such as the ones previously presented, to lock the wheel chock 100 in one direction. It is also possible to use two opposite locking mechanisms inside the same double-sided wheel chock 100.

Double-sided wheel chocks, also called bidirectional wheel chocks, can be useful in different situations. One is when the vehicles have a swap body configuration. Such vehicles include a chassis and a container that can be detached from the chassis. The container has supporting legs to keep it above the ground when detached from the chassis. The same wheel chock can be used to stop the vehicle when it includes both the chassis and the container, and to prevent the chassis of the vehicle from backing up to get under the container. Variants are possible.

Other wheeled vehicles where bidirectional wheel chocks can be useful includes, among other things, trucks having a tank for transporting liquids, such as fuel or others, or trucks that can be loaded or offloaded from the side. A bidirectional wheel chock can be installed, for instance, between two tandem wheels to prevent the vehicle from moving in both travel directions, namely forward and rearward, while the contents are loaded or offloaded. Many other examples exist. Likewise, other configurations and arrangements for the wheel chock 100 are possible as well.

FIGS. 39 and 40 show that the wheel chock 100 include a resilient spacer 900 on both sides. These spacers 900 can be made of rubber or of another suitable material. They have an edge attached over the main body 150 and they project obliquely away from the respective side. They are designed to keep the wheel chock 100 slightly away from the tire of a wheel so as to mitigate the risks of having the wheel chock 100 becoming stuck under the tire when the weight of the vehicle increases as it is loaded. Variants are possible. For instance, a spacer 900 can be only provided on one of the two sides in some implementations. They can also be omitted entirely in others. Still, a spacer can be provided on the wheel chocks 100 of the other examples shown herein.

FIGS. 39 and 40 also show that two-wheel sensors 210 are provided, each facing a corresponding side. The configuration of these wheel sensors 210 is slightly different than that of the other examples. Other configurations and arrangements are possible. For instance, a wheel sensor 210 can be only provided on one side in some implementations. They can also be omitted entirely in others. Other variants are possible as well.

The present detailed description and the appended figures are meant to be exemplary only, and a skilled person will recognize that many changes can be made while still remaining within the proposed concept.

What is claimed is:

1. A wheel chock for use over a ground-anchored base plate in a restraint system to prevent a parked vehicle from moving away in an unauthorized or accidental manner in a departure direction when the wheel chock is in a tire-blocking position on the base plate, the base plate having a plurality of spaced-apart blocking elements and each blocking element having opposite first and second sides, the wheel chock having a tire-facing side to be positioned directly in front of a tire of a wheel of the parked vehicle, the wheel chock including:
   a main body;
   a plurality of spaced-apart first teeth provided underneath the wheel chock to engage the first side of at least one of the blocking elements of the base plate in a latched engagement when the wheel chock is in the tire-blocking position on the base plate; and
   a locking mechanism including:
      a positioning unit located inside the main body and movable between an unlocked position and a fully locked position, the positioning unit having at least one second tooth provided underneath to engage the second side of a corresponding one of the blocking elements in a latched engagement when the positioning unit is in the fully locked position, the at least one second tooth being out of engagement with the blocking elements when the positioning unit is in the unlocked position;
      first means for moving the positioning unit from the unlocked position towards the fully locked position; and
      second means for selectively holding the positioning unit in the fully locked position, the second means being located inside the main body, the second means holding the positioning unit in the fully locked position only when the at least one second tooth unobstructedly engages the second side of the corresponding blocking element while the wheel chock is in the tire-blocking position on the base plate, and the second means including a position detector mounted on the positioning unit.

2. The wheel chock as defined in claim 1, wherein the positioning unit includes a spring-biased linkage on which the position detector is mounted, the spring-biased linkage being interposed between a first portion of the positioning unit engaged by the first means and a second portion of the positioning unit where the at least one second tooth is provided.

3. The wheel chock as defined in claim 2, wherein the spring-biased linkage includes a cylindrical polymeric spring member to mitigate damages to the locking mechanism in case of an overloading force applied on the wheel chock in a direction opposite to the departure direction.

4. The wheel chock as defined in claim 1, wherein the second means include an electromagnet system.

5. The wheel chock as defined in claim 1, wherein the second means include a locking pin system.

6. The wheel chock as defined in claim 1, wherein the second means include a pivoting latch system.

7. The wheel chock as defined in claim 1, wherein the second means includes a locking arrangement and the positioning unit includes a main arm pivotally mounted around a transversal pivot axis, the main arm transmitting a motion received from the first means to other parts of the positioning unit, the main arm having a free end to which a movable portion of the locking arrangement is attached, the movable portion registering with a fixed portion of the locking arrangement only when the positioning unit reaches the fully locked position.

8. The wheel chock as defined in claim 7, wherein the first means include a manually-operated lever pivotally mounted on a side of the main body.

9. The wheel chock as defined in claim 8, wherein the lever transmits a motion to the positioning unit through a transversally-disposed peg engaging the main arm.

10. The wheel chock as defined in claim 7, wherein the locking arrangement includes an electromagnet system.

11. The wheel chock as defined in claim 7, wherein the locking arrangement includes a locking pin system.

12. The wheel chock as defined in claim 7, wherein the locking arrangement includes a pivoting latch system.

13. The wheel chock as defined in claim 1, wherein the locking mechanism further includes third means for moving the positioning unit towards the unlocked position when the first means and the second means are released.

14. The wheel chock as defined in claim 13, wherein the third means include at least one return spring extending between the positioning unit and a fixed location inside the main body.

15. The wheel chock as defined in claim 1, wherein the at least one second tooth is more than one in number and forms a set of longitudinally spaced-apart and substantially downwardly-projecting second teeth.

16. The wheel chock as defined in claim 1, wherein the positioning unit includes a double row of second teeth.

17. The wheel chock as defined in claim 1, wherein the first means include a powered actuator located on the wheel chock.

18. The wheel chock as defined in claim 17, wherein the powered actuator is one among a group consisting of a hydraulic actuator, a pneumatic actuator and an electric actuator.

* * * * *